US012416808B2

(12) United States Patent
Yang

(10) Patent No.: US 12,416,808 B2
(45) Date of Patent: Sep. 16, 2025

(54) WAVEGUIDE COMBINER WITH SEPARATE IN-COUPLING AND OUT-COUPLING PLATES

(71) Applicant: Microsoft Technology Licensing, LLC, Redmond, WA (US)

(72) Inventor: Long Yang, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/305,502

(22) Filed: Apr. 24, 2023

(65) Prior Publication Data

US 2024/0353682 A1 Oct. 24, 2024

(51) Int. Cl.
*G02B 27/01* (2006.01)
*G02B 5/32* (2006.01)
(Continued)

(52) U.S. Cl.
CPC .......... *G02B 27/0172* (2013.01); *G02B 5/32* (2013.01); *G02B 27/0081* (2013.01);
(Continued)

(58) Field of Classification Search
CPC ........ G02B 27/0172; G02B 2027/0178; G02B 2027/0174; G02B 27/0176; G02B 27/017; G02B 27/0944; G02B 27/0938; G02B 27/0103; G02B 2027/0105; G02B 27/283; G02B 6/0011; G02B 6/0013; G02B 6/0033; G02B 6/0075; G02B 6/0081; G02B 6/26; G02B 6/24; G02B 6/42; G02F 1/035; G02F 1/313; G02F 1/011; G02F 1/29
See application file for complete search history.

(56) References Cited

U.S. PATENT DOCUMENTS 10,976,557 B2   4/2021  Alexander et al.
11,073,701 B2 *  7/2021  Matsumura .......... G02B 27/022
(Continued)

FOREIGN PATENT DOCUMENTS

CN    114779479 B    12/2022
WO    2023005501 A1   2/2023

OTHER PUBLICATIONS

Draper, et al., "Holographic Curved Waveguide Combiner For HUD/AR With 1-D Pupil Expansion", In Journal of Optics Express, vol. 30, Issue 2, Jan. 11, 2022, pp. 2503-2516.
(Continued)

*Primary Examiner* — Dismery Mercedes

(57) ABSTRACT

A waveguide-based see-through combiner for mixed-reality head mounted display (HMD) devices uses input and output couplers comprising holographic optical elements (HOEs) to respectively in-couple light for virtual images from a display engine to the waveguide combiner and out-couple the virtual images to an HMD user's eyes. The in-coupling and out-coupling HOEs are respectively disposed on separate plates that are optically coupled by a waveguide. The plates and waveguide may be fabricated (e.g., molded) from an optically transparent polymeric material. The utilization of separate plates enables optimization for placement and sizing of the out-coupling HOE in front of the user's eye to thereby increase eyebox size for the virtual images and improves quality of the see-through experience.

10 Claims, 21 Drawing Sheets

(51) Int. Cl.
*G02B 27/00* (2006.01)
*G02B 27/09* (2006.01)
*G02B 27/10* (2006.01)

(52) U.S. Cl.
CPC ..... *G02B 27/0103* (2013.01); *G02B 27/0176* (2013.01); *G02B 27/0944* (2013.01); *G02B 27/106* (2013.01); *G02B 27/0093* (2013.01); *G02B 2027/0105* (2013.01); *G02B 2027/0174* (2013.01); *G02B 2027/0178* (2013.01)

(56) References Cited

U.S. PATENT DOCUMENTS

| | | | | |
|---|---|---|---|---|
| 2018/0095283 | A1* | 4/2018 | Takeda | G02B 6/005 |
| 2018/0120563 | A1 | 5/2018 | Kollin et al. | |
| 2019/0094549 | A1* | 3/2019 | Nicholson | G02B 6/00 |
| 2020/0142196 | A1* | 5/2020 | Mills | G06F 3/013 |
| 2020/0166753 | A1 | 5/2020 | Vallius et al. | |
| 2020/0225498 | A1* | 7/2020 | Potnis | G02B 5/1866 |
| 2021/0096379 | A1* | 4/2021 | Peroz | G02B 27/18 |
| 2021/0157158 | A1* | 5/2021 | Freedman | G02B 30/60 |
| 2022/0091323 | A1* | 3/2022 | Yaroshchuk | G02B 6/29304 |
| 2022/0107501 | A1 | 4/2022 | Muravev | |
| 2023/0003953 | A1* | 1/2023 | Haque | G02B 6/4209 |
| 2023/0152585 | A1* | 5/2023 | Zhang | G02B 27/0172 385/37 |
| 2023/0280586 | A1* | 9/2023 | Sluka | G02B 27/0172 359/630 |
| 2023/0375834 | A1* | 11/2023 | Lowney | G02B 27/286 |
| 2024/0053822 | A1* | 2/2024 | Takada | G02B 27/0093 |

OTHER PUBLICATIONS

Hwang, et al., "Uniformity Improvement Of A Reconstructed-Holographic Image In A Near-Eye Display System Using Off-Axis Hoe", In Journal of Optics Express, vol. 30, Issue 12, May 31, 2022, pp. 21439-21454.

Kress, et al., "Waveguide Combiners For Mixed Reality Headsets: A Nanophotonics Design Perspective", In Journal of Nanophotonics, vol. 10, Issue 1, Oct. 2020, pp. 41-74.

Yang, et al., "Design Of Off-Axis Reflective Imaging Systems Based On Freeform Holographic Elements", In Journal of Optics Express, vol. 30, Issue 11, May 20, 2022, pp. 20117-20134.

Yoshida, et al., "A Plastic Holographic Waveguide Combiner For Light-Weight And Highly-Transparent Augmented Reality Glasses", In Journal of the Society for Information Display, vol. 26, Issue 5, Apr. 30, 2018, 8 Pages.

International Search Report and Written Opinion received for PCT Application No. PCT/US2024/024169, mailed on Aug. 2, 2024, 12 pages.

* cited by examiner

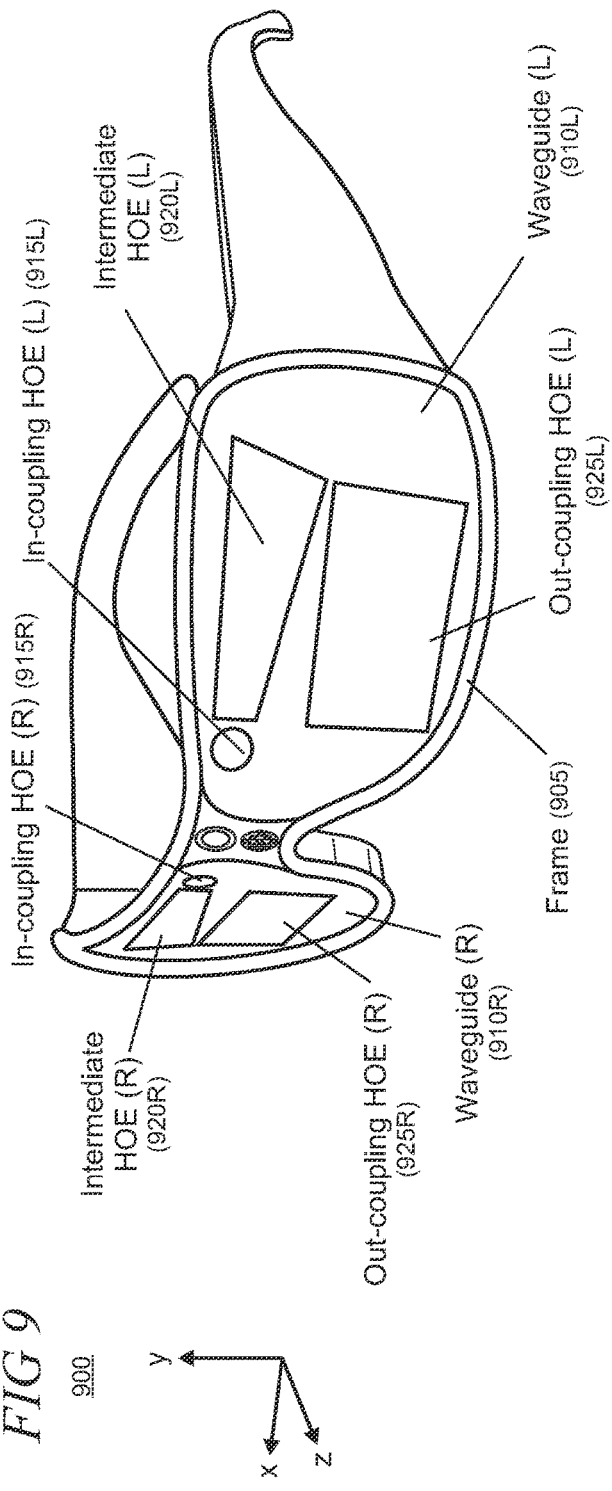
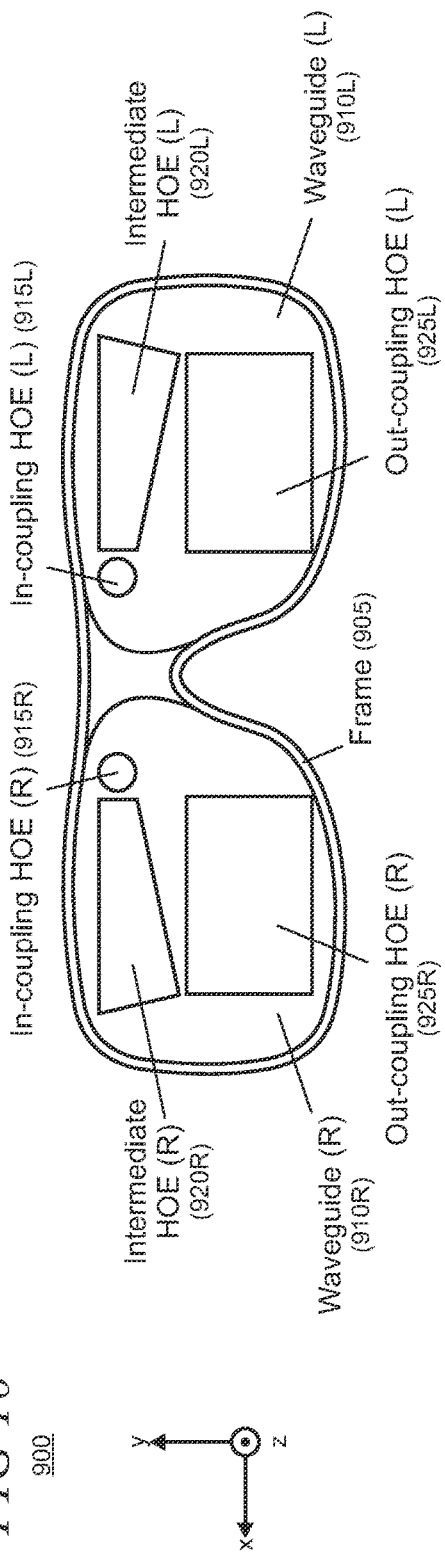
FIG 9
900
FIG 10
900

1200

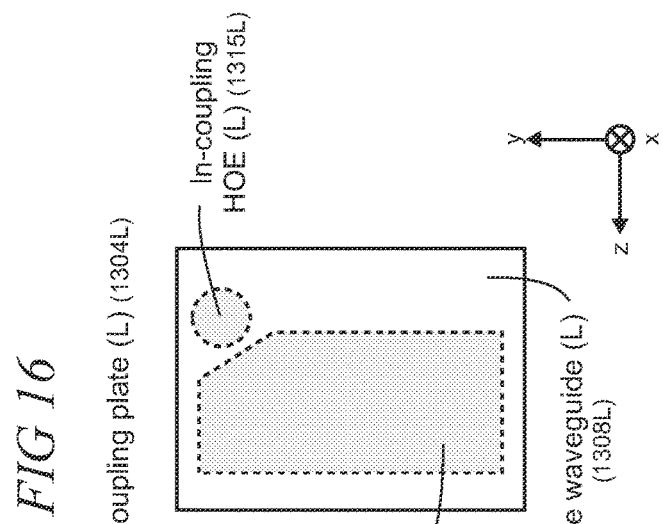
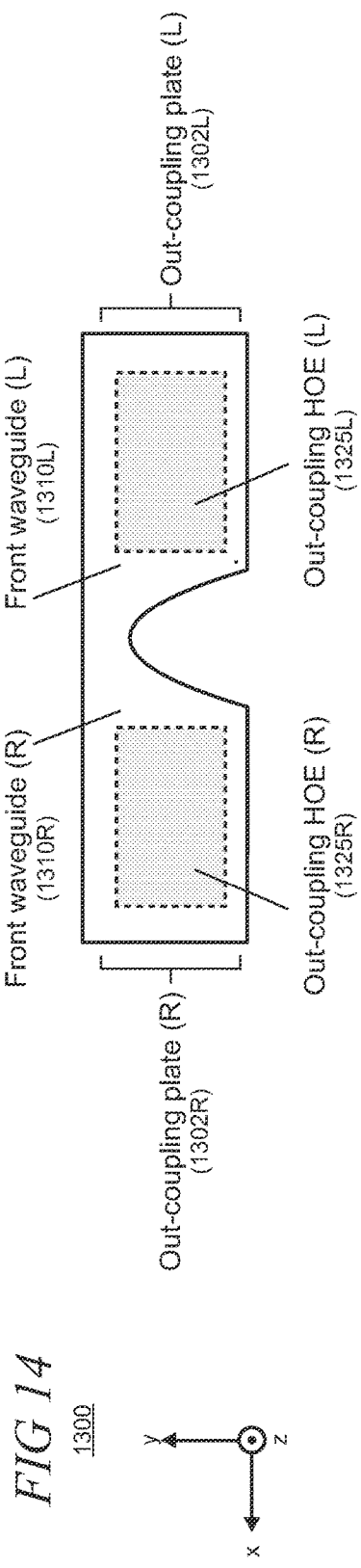
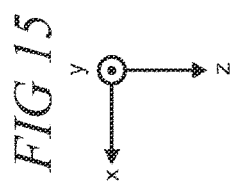

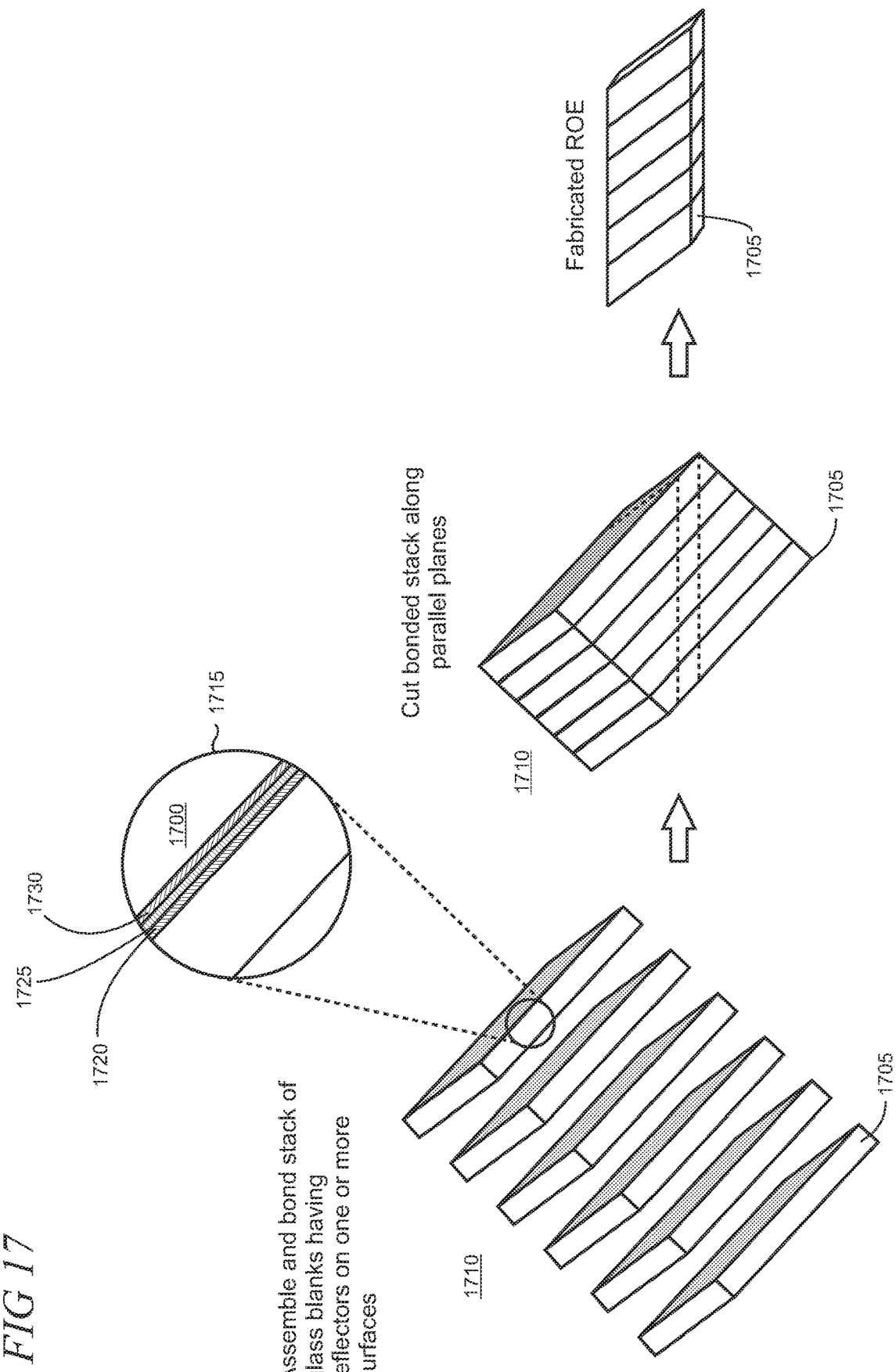

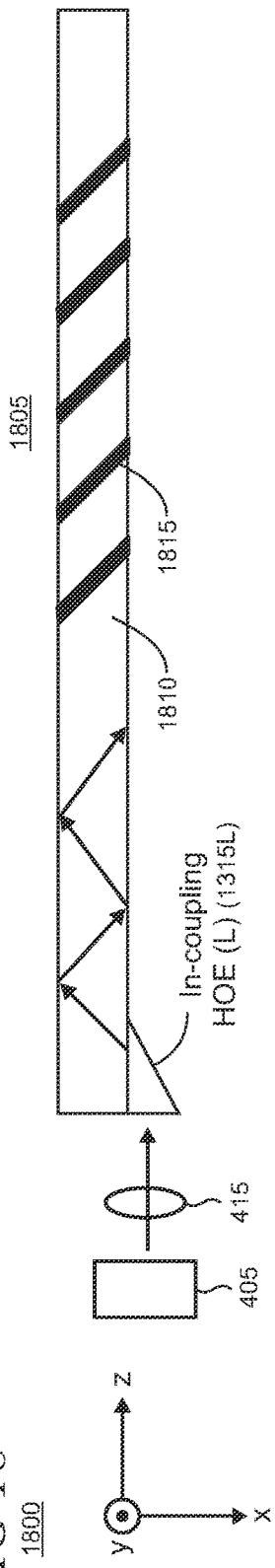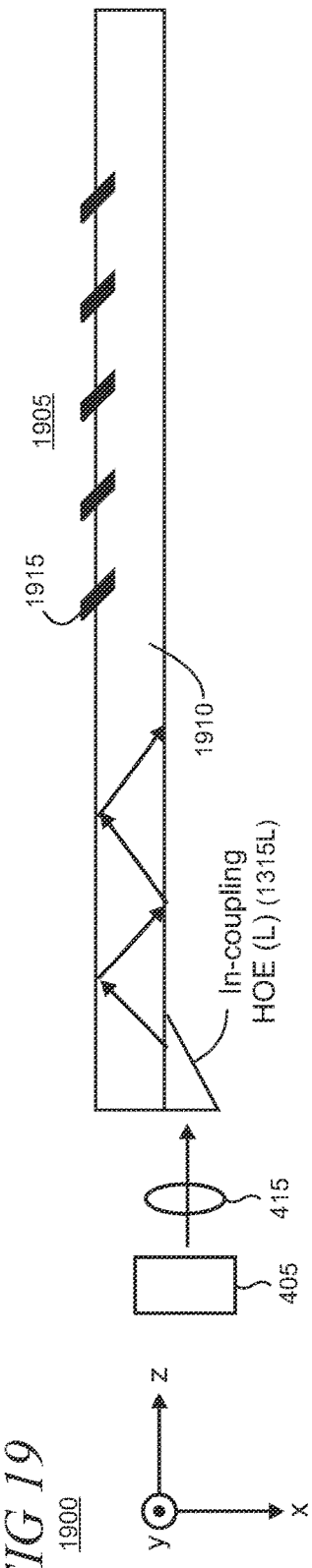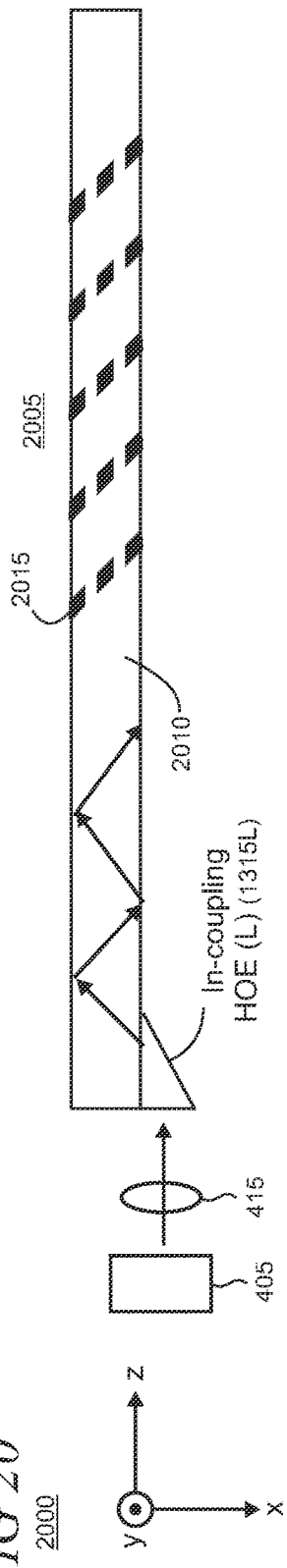

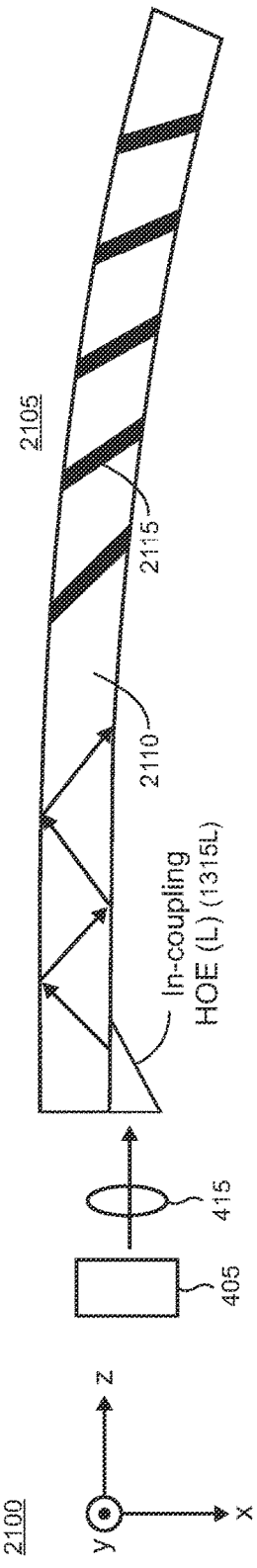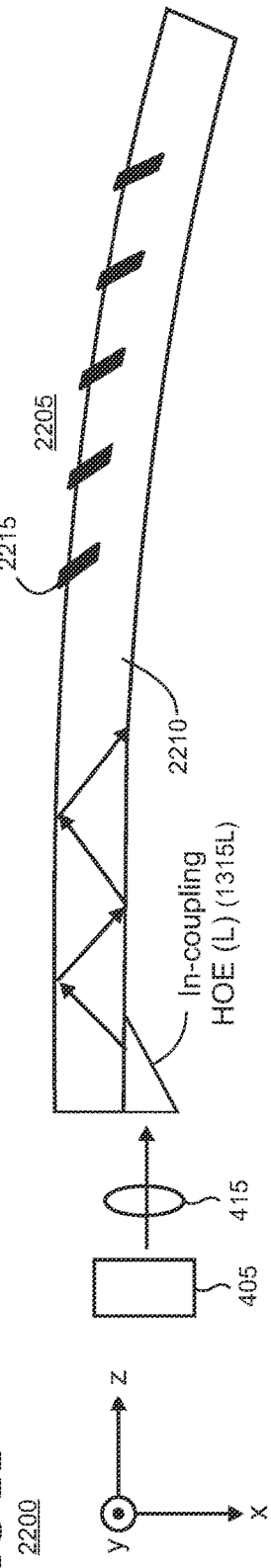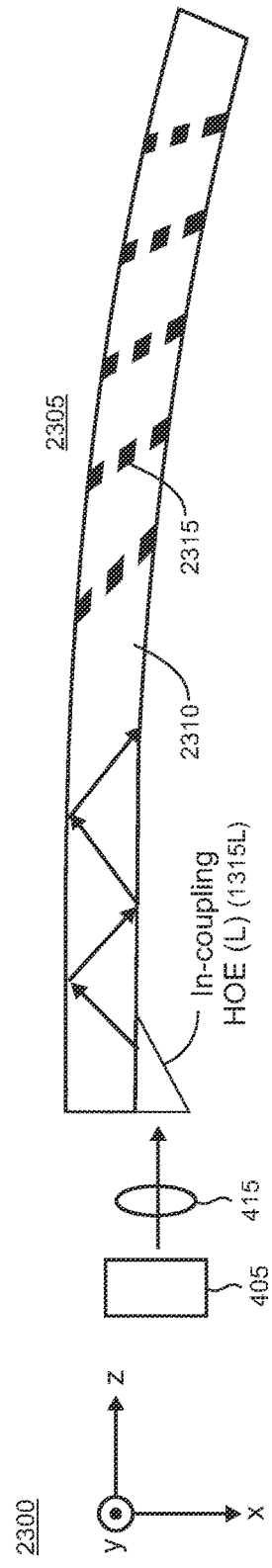

2400

2400

2400

2900

WAVEGUIDE COMBINER WITH SEPARATE IN-COUPLING AND OUT-COUPLING PLATES

BACKGROUND

Mixed-reality computing devices, such as head-mounted display (HMD) devices and handheld mobile devices (e.g., smart phones, tablet computers, etc.), are typically configurable to display information to a user about virtual images, and/or images of real objects in a field of view (FOV) of the user. For example, some HMD devices are configured to display, using a see-through display system, virtual environments with real-world objects mixed in, or real-world environments with virtual objects mixed in.

SUMMARY

Disclosed are an optical waveguide-based combiner apparatus that includes separate in-coupling and out-coupling plates of holographic optical elements (HOEs) and associated methods of fabrication. The waveguide combiner is configurable for use in a mixed-reality see-through display system in an HMD device that combines virtual and real-world images. The in-coupling and out-coupling plates are optically coupled by a connecting waveguide and spatially separated in a non-co-planar configuration so that the out-coupling plate is positioned in front of a user's eye when the HMD device is donned, while the in-coupling plate is positioned outside the boundaries of the user's visual field. An out-coupling HOE located on the out-coupling plate is optimally sized and positioned with respect to the user's eye because the additional HOEs used in the combiner for input coupling and exit pupil expansion are located on the separate in-coupling plate. In addition, the user is not required to look through the additional HOEs that are located adjacent to the out-coupling HOE in conventional see-through display systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 9 is a pictorial view of an illustrative conventional arrangement of HOEs in an HMD device that are configured for in-coupling, exit pupil expansion in two directions, and out-coupling;

FIG. 10 shows a front view of the arrangement of HOEs in the HMD device shown in FIG. 9;

FIG. 14 is a front view of an illustrative example of a mixed-reality HMD device using the present waveguide combiner with separate in-coupling and out-coupling plates;

FIG. 15 is a top view of a portion of the illustrative mixed-reality HMD device shown in FIG. 13;

FIG. 16 is a side view of an illustrative example of an in-coupling plate;

FIG. 17 shows illustrative fabrication techniques for an HOE using stacked glass blanks that have one or more layers of thin film deposited on one or more surfaces;

FIGS. 18-23 show top views of various illustrative embodiments of an in-coupling plate having an HOE that uses a concatenated array of mirror elements embedded in a waveguide having planar or curved configurations;

Like reference numerals indicate like elements in the drawings. Elements are not drawn to scale.

DETAILED DESCRIPTION

Figure 1:
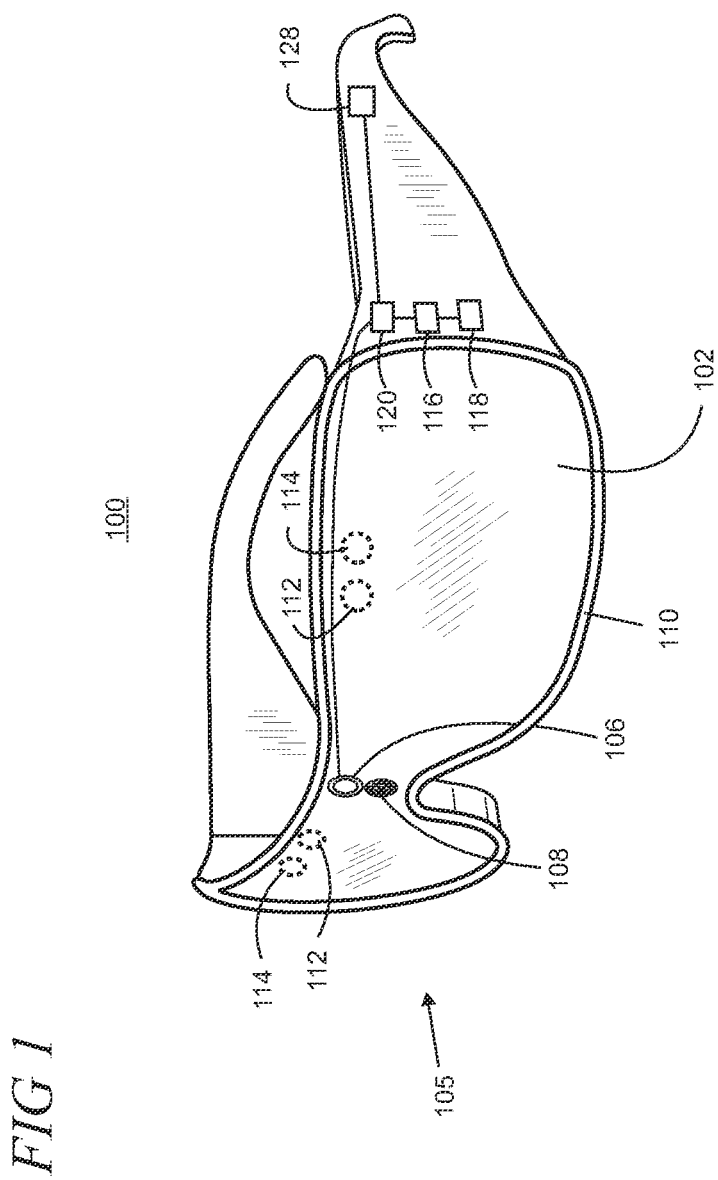
FIG. 1 is a pictorial view of an illustrative example of a mixed-reality head-mounted display (HMD) device.

The present waveguide combiner with separate in-coupling and out-coupling plates is based on propagation of a virtual image light field in an optical guide that essentially operates as a transparent periscope (e.g., on a per-eye basis) with a single entrance pupil and an exit pupil that is expanded (e.g., replicated) in horizontal and vertical directions. A typical application for the waveguide combiner is a mixed-reality wearable headset such as smart glasses or a head-mounted display (HMD) device. In a mixed-reality user experience, the combiner is configured to be see-through to provide a display system for both digital content (i.e., images of virtual objects) and the real world for the HMD device user.

The waveguide combiner uses input and output couplers comprising holographic optical elements (HOEs) to respectively in-couple light for virtual images from a display engine to the waveguide combiner and out-couple the virtual images to the user's eyes. HOEs are defined herein as optical components that are used to guide virtual images from a light engine (i.e., a virtual imaging device) to one or more eyes of the HMD device user. HOEs are implementable, for example, as lenses, mirrors (partial and/or full), diffusers, gratings, scanners, volume holographic gratings, combiners, and the like, employing the principles of diffraction, refraction, and/or reflection as suitable for a given HOE design. Common HOE types that are usable in the present waveguide combiner with separate in-coupling and out-coupling plates include diffractive optical elements (DOEs) and reflective optical elements (ROEs).

An in-coupling HOE is disposed in an in-coupling plate and an out-coupling HOE is disposed in a separate out-coupling plate. The in-coupling HOE couples virtual image light from the display engine into the in-coupling plate of the waveguide combiner. In an illustrative embodiment, an intermediate HOE is disposed in the in-coupling plate along a virtual image light path between the in- and out-coupling HOEs. The intermediate HOE is configured for one-dimensional (1D) expansion in a first (e.g., horizontal) direction of an exit pupil of the waveguide combiner compared to an input pupil for the virtual images from the light engine. The out-coupling HOE in the out-coupling plate expands the exit pupil in a second (e.g., vertical) direction and out-couples the virtual image light to the user with an exit pupil that is expanded in two directions (i.e., horizontally and vertically) compared to an entrance pupil to the waveguide combiner.

In other illustrative embodiments of the present waveguide combiner, the in-coupling and out-coupling plates are spatially separated in the waveguide combiner and broad-area surfaces of the respective plates are configured to be non-parallel. The edge surfaces of the plates are optically coupled with a connecting waveguide to facilitate propagation of virtual image light between the in-coupling plate and the out-coupling plate. The plates and connecting waveguide may be fabricated (e.g., molded) from an optically transparent polymeric material. ROEs may be utilized in the waveguide combiner plates that are fabricated from a stack of glass plates that have partially reflective coatings to create a cascaded array of mutually-parallel reflecting internal surfaces or an optical beam splitter. An in-coupling HOE may comprise a prism or prism array.

In other illustrative embodiments, a see-through waveguide combiner is utilized in an HMD device with a display engine that produces light for virtual images to support a mixed-reality experience for an HMD device user. The see-through combiner includes a see-through plate supporting an out-coupling HOE and a non-see-through plate that supports an in-coupling HOE and an intermediate HOE. The see-through and non-see-through plates are positioned in the waveguide combiner to be non-co-planar and are optically coupled by a waveguide. The HMD device may have an eyeglasses form factor with pairs of lenses and temples in which a see-through-plate is disposed in a lens and a non-see-through plate is disposed in a temple.

In other illustrative embodiments, the intermediate and out-coupling HOEs are provided as inserts in respective cavities in an injection mold utilizable in an insert injection molding process. The insert-receiving cavities are non-co-planar, and the mold includes a cavity to form a waveguide in the finished molded waveguide combiner between the separate plates of HOEs. The mold may be configured to form an input-coupling prism in an in-coupling plate of the finished molded waveguide combiner. Positioning features may also be molded into the finished waveguide combiner.

The present waveguide combiner with separate in-coupling and out-coupling plates provides technical advantages over conventional waveguide combiner designs. The utilization of separate plates enables optimization for placement and sizing of the out-coupling HOE in front of the user's eye. For example, the out-coupling HOE is configurable to provide an increase in the size of the display system's eyebox to provide for wide interpupillary distance coverage. A definition of the eyebox is the three-dimensional region located between the waveguide combiner and the human eye pupil over which the entire field of view (FOV) of virtual images is visible for a typical pupil size. An increased eyebox size typically improves HMD device comfort and enables a given device design to accommodate a bigger population of users.

Another technical advantage provided by the present waveguide combiner with separate in-coupling and out-coupling plates is improving the quality of the see-through experience for an HMD device user. See-through quality is typically considered to be an important parameter to maximize in mixed-reality systems. While some HOE configurations provide satisfactory see-through quality, they may reduce see-through transmittance and brightness and introduce optical distortion, artifacts, occlusions, and other aberrations. By locating the HOEs for in-coupling and exit pupil expansion in a separate plate that is positioned outside the user's visual field, obstructions to the see-through field of the waveguide combiner are minimized.

The present waveguide combiner provides benefits in combiner manufacturing by enabling the separate in-coupling and out-coupling plates to be readily subjected to different processes during fabrication. For example, optical coatings can be applied to HOEs on the in-coupling plate to improve, for example, coupling efficiency and/or to reduce virtual image light leakage. Such coatings may be undesirable for the out-coupling HOE because of the negative impact on see-through. The non-see-through plate with the in-coupling HOE and intermediate HOE being separately embodied from the see-through plate with the out-coupling HOE in the present design means that coatings can be applied to the in-coupling and/or intermediate HOEs without the necessity of masking the out-coupling HOE or otherwise restricting coating application to a particular area of a plate.

Figure 2:
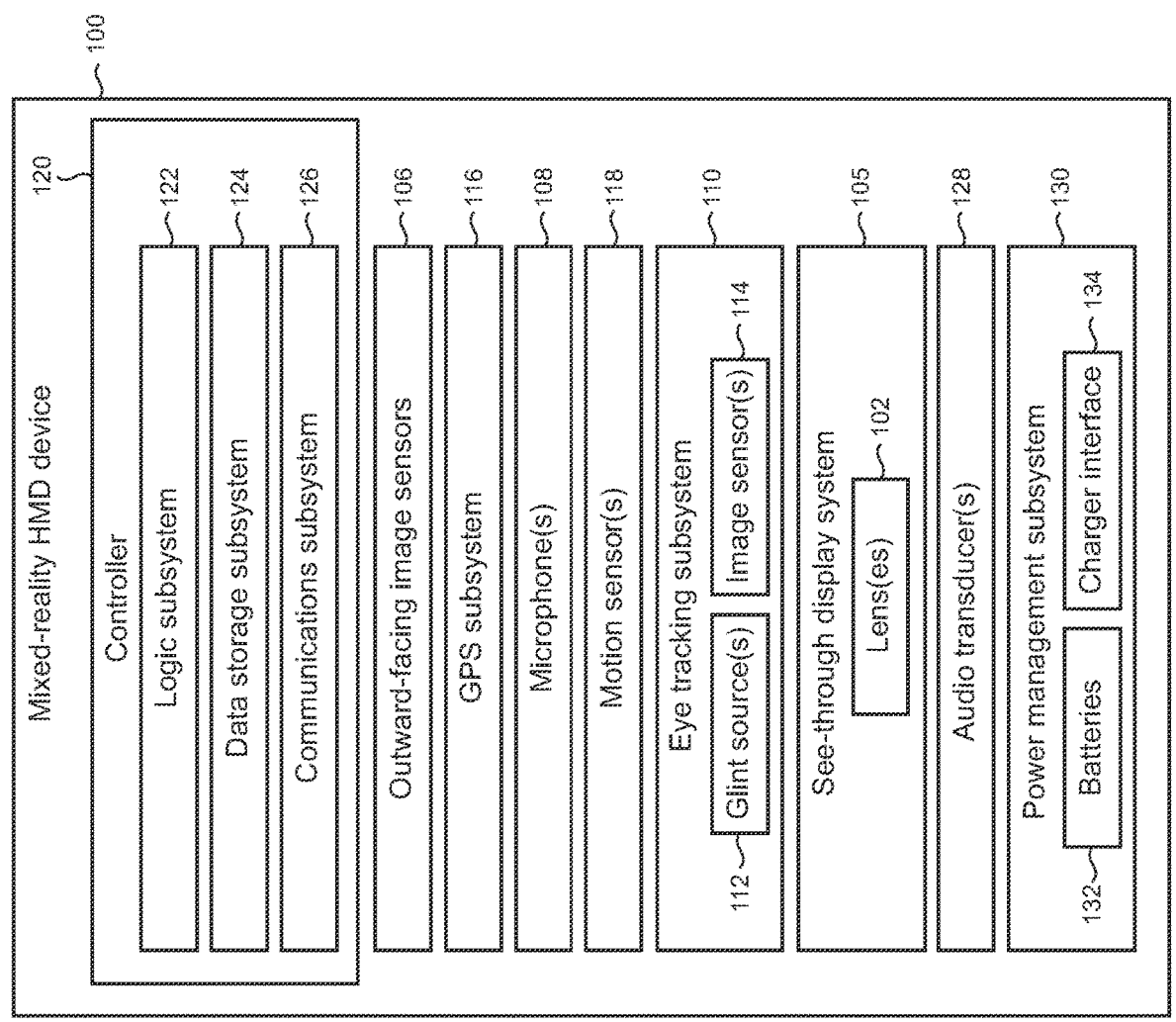
FIG. 2 shows a block diagram of an illustrative example of a mixed-reality HMD device.

Turning now to the drawings, FIG. 1 shows an illustrative example of a mixed-reality HMD device 100 that utilizes a conventional display system 105, and FIG. 2 shows a functional block diagram of the HMD device. The HMD device comprises one or more lenses 102 that form a part of the see-through display system 105, so that images are displayed using lenses that incorporate one or more waveguide-based display systems, such as a near-eye display system. The HMD device further comprises one or more outward-facing image sensors 106 configured to acquire images of a background scene and/or a physical environment being viewed by a user and typically includes one or more microphones 108 configured to detect sounds, such as voice commands from a user. Outward-facing image sensors 106 typically include one or more depth sensors and/or one or more two-dimensional image sensors.

The HMD device 100 may further include an eye-tracking subsystem 110 configured for detecting a direction of gaze of each eye of a user (not shown) or a direction or location of focus. The eye-tracking subsystem can optically include a body tracking subsystem such as a hand tracker, or the body tracking subsystem can be separately instantiated. The eye-tracking subsystem is configurable to determine gaze directions of each of a user's eyes in any suitable manner. For example, in the illustrative example shown, the eye-tracking subsystem includes one or more glint sources 112, such as infrared light sources, that are configured to cause a glint of light to reflect from each eyeball of a user, and one or more image sensors 114, such as inward-facing sensors, that are configured to capture an image of each eyeball of the user. Changes in the glints from the user's eyeballs and/or a location of a user's pupil, as determined from image data gathered using the image sensors 114, are used to determine a direction of gaze.

In addition, a location at which gaze lines projected from the user's eyes intersect the external display may be used to determine an object at which the user is gazing (e.g., a displayed virtual object and/or real background object). The eye-tracking subsystem 110 includes any suitable number and arrangement of light sources and image sensors. In some implementations, the eye-tracking subsystem is omitted from the HMD device.

The HMD device 100 generally also includes additional sensors. For example, the HMD device comprises a global positioning system (GPS) subsystem 116 to allow a location of the HMD device to be determined. This may help to identify real-world objects, such as buildings, etc., that are located in the user's adjoining physical environment.

The HMD device 100 typically includes one or more motion sensors 118 (e.g., inertial, multi-axis gyroscopic, or acceleration sensors) to detect movement and position/orientation/pose of a user's head when the user is wearing the system as part of a mixed-reality or virtual-reality HMD device. Motion data is usable, potentially along with eye-tracking glint data and outward-facing image data, for gaze detection and eye and/or body tracking, as well as for image stabilization to help correct for blur in images from the outward-facing image sensors 106. The use of motion data generally allows for changes in gaze direction to be tracked even if image data from outward-facing image sensors cannot be resolved.

In addition, motion sensors 118, as well as the microphones 108 and eye-tracking subsystem 110 (and/or an optional body tracking subsystem), also are employed as user input devices in some cases, such that a user may interact with the HMD device 100 via gestures of the eye, neck, head and/or fingers/hands, as well as via verbal commands in some cases. It may be understood that the sensors illustrated in FIGS. 1 and 2 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 100 further includes a controller 120 such as one or more processors having a logic subsystem 122 and a data storage subsystem 124 in communication with the sensors, eye-tracking subsystem 110, display subsystem 105, and/or other components through a communications subsystem 126. The communications subsystem 126 can also facilitate the display system 105 being operated in conjunction with remotely located resources, such as processing, storage, power, data, and services. That is, in some implementations, an HMD device can be operated as part of a system that can distribute resources and capabilities among different components and subsystems.

The storage subsystem 124 includes instructions stored thereon that are executable by logic subsystem 122, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 100 is configured with one or more audio transducers 128 (e.g., speakers, earphones, etc.) so that audio can be utilized as part of a mixed-reality or virtual-reality experience. A power management subsystem 130 may include one or more batteries 132 and/or protection circuit modules (PCMs) and an associated charger interface 134 and/or remote power interface for supplying power to components in the HMD device 100.

It may be appreciated that the HMD device 100 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

The display system 105 is arranged in some implementations as a near-eye display. In a near-eye display, the display engine or imaging device does not actually shine the images on a surface such as a glass lens to create the display for the user. This is not feasible because the human eye cannot focus on something that is that close. Rather than create a visible image on a surface, the near-eye display uses an optical system to form a pupil and the user's eye acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the virtual image light after leaving the display system. The exit pupil defines the eyebox which comprises a spatial range of eye positions of the user in which the virtual images projected by the display system are visible.

Figure 3:
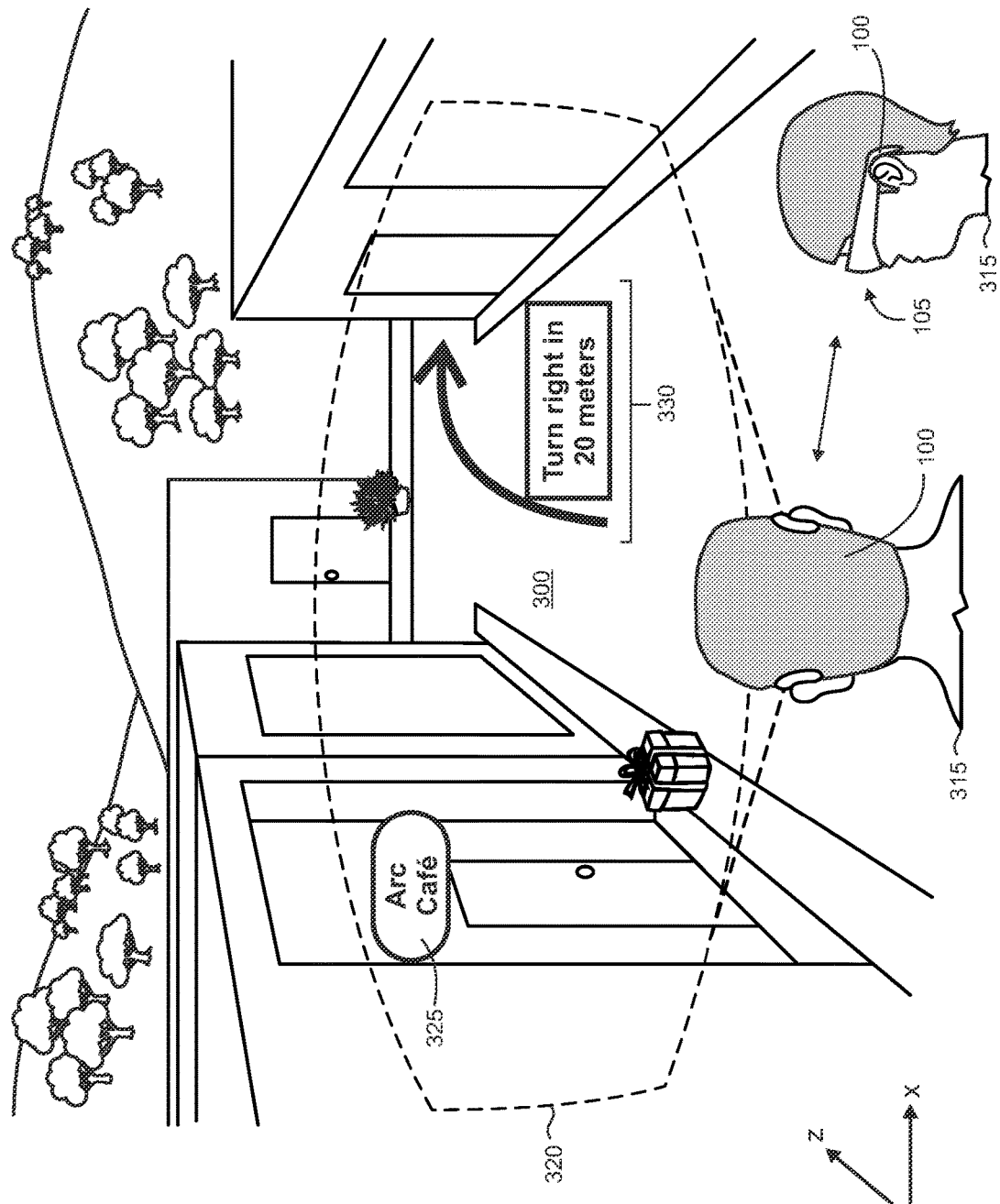
FIG. 3 illustratively shows virtual images that are overlayed onto real-world images within a field of view (FOV) of a mixed-reality HMD device.

FIG. 3 shows the HMD device 100 worn by a user 315 as configured for mixed-reality experiences in which the display system 105 is implemented as a near-eye display system having at least a partially transparent, see-through waveguide, among various other components. As noted above, a suitable display engine (not shown) generates virtual images that are guided by the waveguide in the display system to the user. Being see-through, the waveguide in the display system enables the user to perceive light from the real world.

The see-through waveguide-based display system 105 can render images of various virtual objects that are superimposed over the real-world images that are collectively viewed using the see-through waveguide display to thereby create a mixed-reality environment 300 within the HMD device's FOV (field of view) 320. It is noted that the FOV of the real world and the FOV of the images in the virtual world are not necessarily identical, as the virtual FOV provided by the display system is typically a subset of the real FOV. FOV is typically described as an angular range in horizontal, vertical, or diagonal dimensions over which virtual images can be projected.

It is noted that FOV is just one of many parameters that are typically considered and balanced by HMD device designers to meet the requirements of a particular implementation. For example, such parameters may include eyebox size, brightness, transparency and duty time, contrast, resolution, color fidelity, depth perception, size, weight, form-factor, and user comfort (i.e., wearable, visual, and social), among others.

In the illustrative example shown in FIG. 3, the user 315 is physically walking in a real-world urban area that includes city streets with various buildings, stores, etc., with a countryside in the distance. The FOV 320 of the cityscape viewed on HMD device 100 changes as the user moves through the real-world environment and the device can render static and/or dynamic virtual images over the real-world view. In this illustrative example, the virtual images include a tag 325 that identifies a restaurant business and directions 330 to a place of interest in the city. The mixed-reality environment 300 seen visually on the display system 105 may also be supplemented by audio and/or tactile/haptic sensations produced by the HMD device in some implementations.

Figure 4:
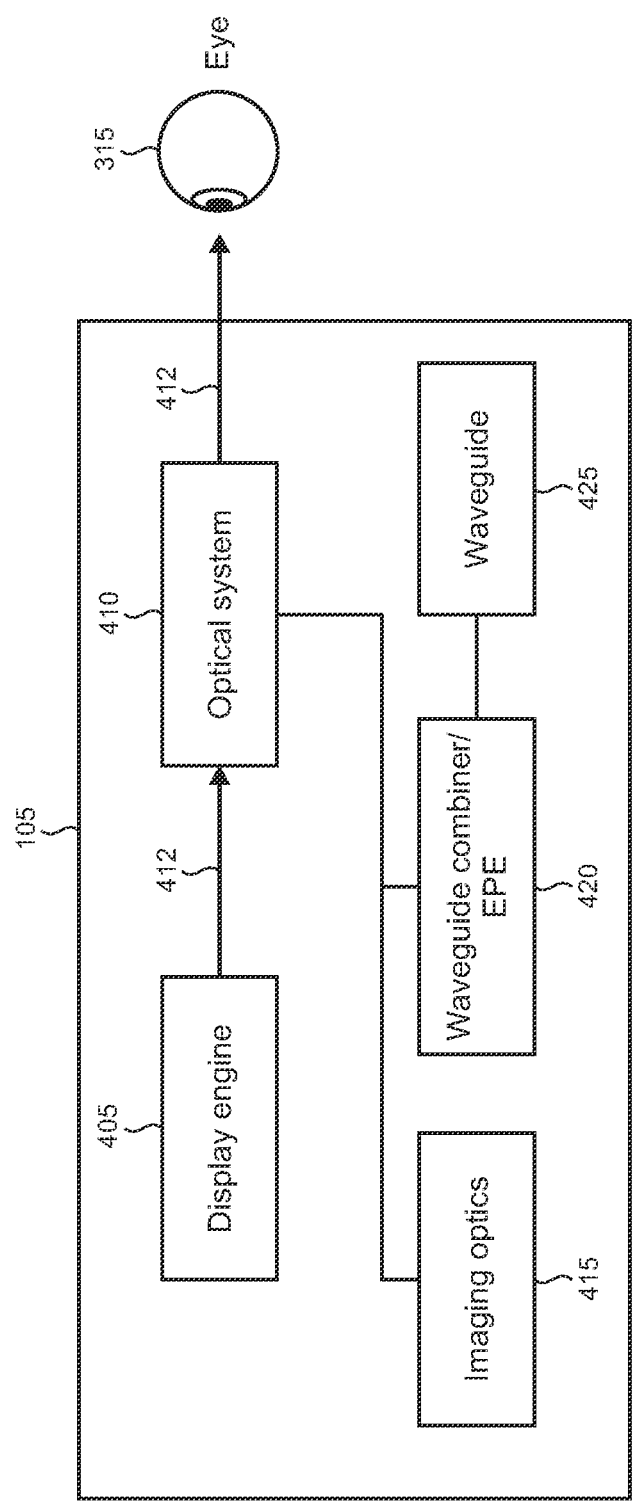
FIG. 4 shows illustrative components of a display system that may be utilized in an HMD device.

FIG. 4 shows illustrative components of the display system 105 utilized in the HMD device 100 in an illustrative mixed-reality embodiment. The display system includes a display engine 405 and an optical system 410 to provide virtual images and views of the real world to the user 315 over a light path 412. The optical system includes imaging optics 415 to support an optical interface between the light engine and a waveguide combiner 420 which, in this example, includes an exit pupil expander (EPE) functionality. The imaging optics typically include optical elements such as lenses, mirrors, filters, gratings, and the like, and may further include electromechanical elements such as MEMS devices in scanning type light engine implementations.

A waveguide 425 facilitates light transmission between the display engine 405 and the user's eye 315 over the light path 412. One or more waveguides can be utilized in the display system 105 because they are transparent (or partially transparent in some implementations) and because they are generally small and lightweight (which is desirable for HMD devices where size and weight are generally sought to be minimized for reasons of performance and user comfort). For example, the waveguide can enable the display engine to be located out of the way, for example, on the side of the user's head or near the forehead, leaving only a relatively small, light, and transparent waveguide optical element in front of the eyes.

Figure 5:
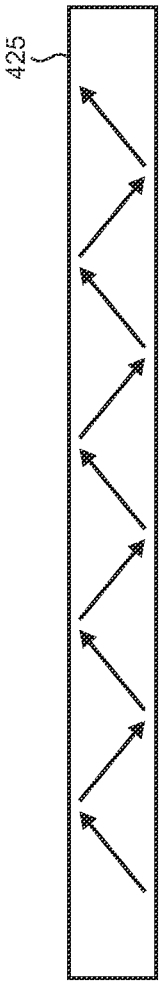
FIG. 5 shows propagation of light in a waveguide by total internal reflection (TIR)

In an illustrative implementation, the waveguide 425 operates using a principle of total internal reflection (TIR), as shown in FIG. 5, so that light can be coupled among the various optical elements in the display system 105. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

As discussed in more detail below, the waveguide 425 is configured to include holographic optical elements (HOEs) having, for example, diffraction gratings, mirror structures and/or other reflective and/or partially reflective surfaces to guide light propagation over the light path 412 in the waveguide combiner 420 within a defined spatial region within the waveguide.

Figure 6:
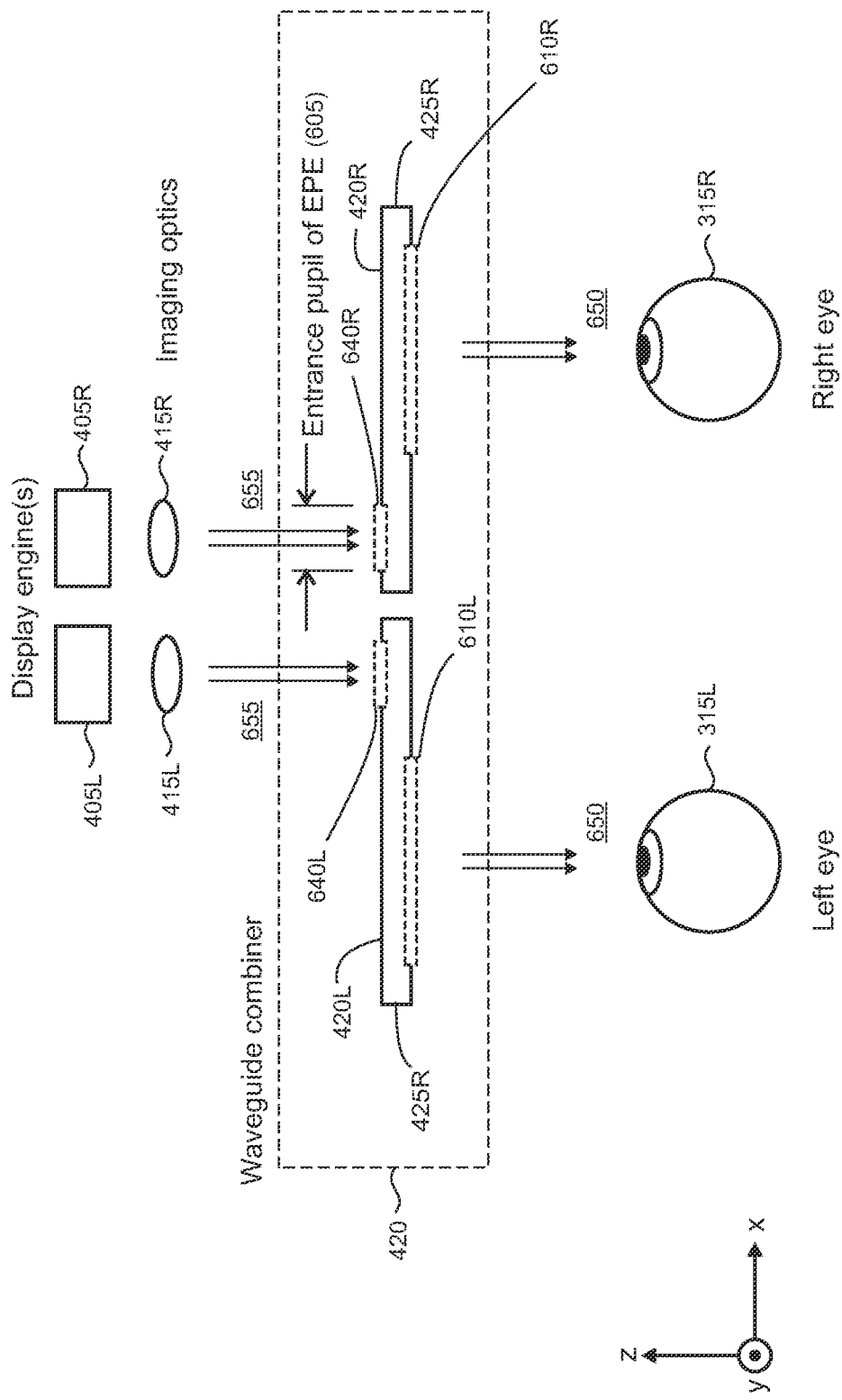
FIG. 6 shows a top view of an illustrative waveguide combiner that includes an exit pupil expander.

FIG. 6 shows a top view of an illustrative waveguide combiner 420 that uses separate left and right combiners (420L and 420R), each associated with a respective display engine (405L and 405R) and imaging optics (415L and 415R) to generate, for example, stereo virtual images for the user 315. Each waveguide includes EPE functionality and receives one or more input optical beams from a respective display engine as an entrance pupil 605 for virtual image light to produce one or more output optical beams with expanded exit pupil in one or two directions relative to the input. The expanded exit pupil typically facilitates a virtual display to be sufficiently sized to meet the various design requirements, such as eyebox size, image resolution, FOV, and the like, of a given optical system while enabling the imager and associated components to be relatively light and compact.

The waveguide combiner 420 utilizes two output couplers, 610L and 610R that are supported on the waveguides 425L and 425R and two input couplers 640L and 640R. The input and output couplers are configurable as HOEs including one of DOE, ROE, or a combination. One or more intermediate HOEs (not shown in FIG. 6) are disposed on the left and right waveguides in a stacked plate configuration, as described below. The HOEs are generally arrangeable in various configurations on the waveguides, for example, on the same side or different sides of the waveguides and may further be single- or double-sided in some implementations. While the waveguide combiner is depicted as having a planar configuration, other shapes may also be utilized including, for example, curved or partially spherical shapes, in which case, mirror structures in the HOEs disposed thereon may be non-co-planar.

Exemplary output beams 650 from the waveguide combiner 420 are parallel to the exemplary input beams 655 that are output from the display engines 405 to the input couplers 640. In some implementations, the input beams are collimated such that the output beams are also collimated, as indicated by the parallel lines in the drawing. Typically, in waveguide-based combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread.

Figure 7:
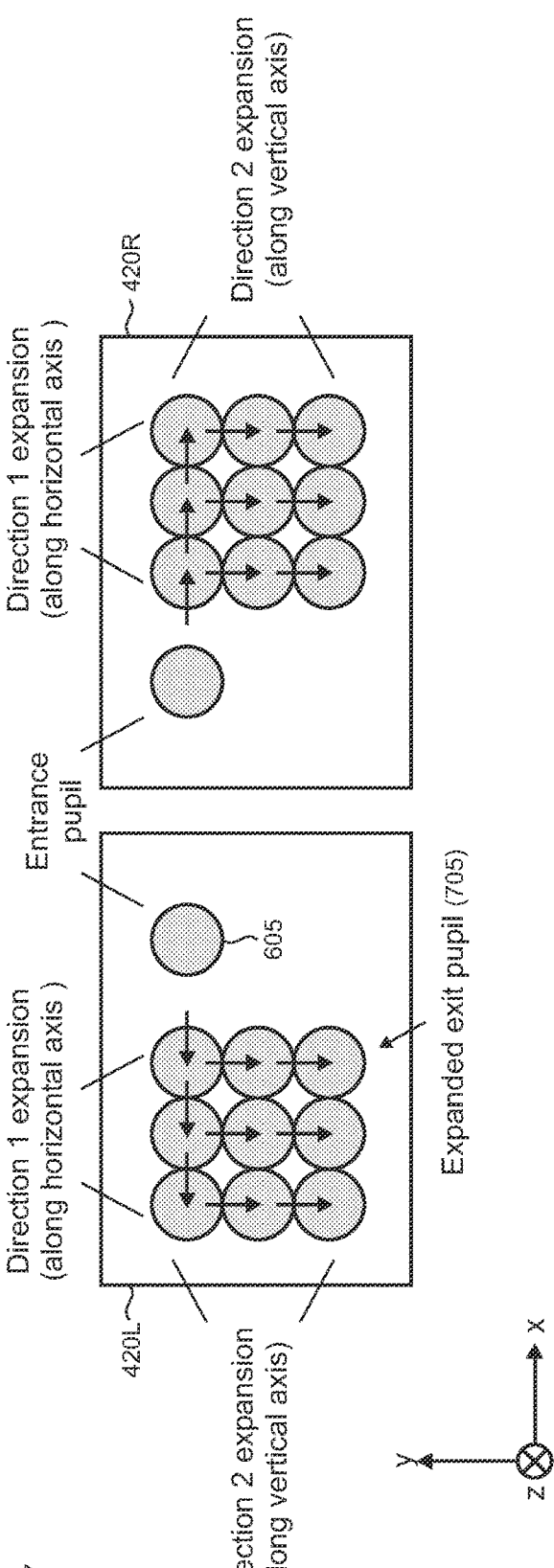
FIG. 7 shows a front view of an illustrative waveguide combiner with an exit pupil expander in which the exit pupil is expanded along two directions of the field of view (FOV) via pupil replication.

As shown in FIG. 7, the waveguide combiner 420 is configured to provide an expanded exit pupil 705 in two directions (i.e., along each of a first and second coordinate axis) compared with the entrance pupil 605 at the input couplers (not shown in FIG. 7) of the waveguide combiner 420. As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye display system is upright and forward facing, but less intuitive for other usage scenarios. The listed terms are not to be construed to limit the scope of the configurations (and usage scenarios therein) of near-eye display features utilized in the present arrangement.

Figure 8:
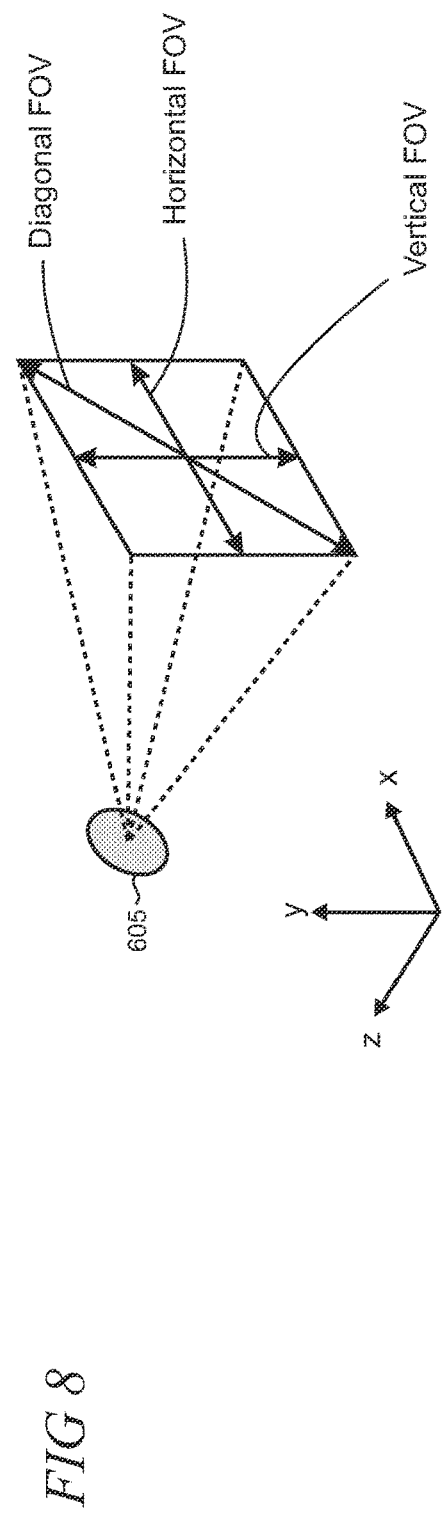
FIG. 8 shows an illustrative input to an exit pupil expander in which the FOV is described by angles in horizontal, vertical, or diagonal orientations.

The entrance pupil to the waveguide combiner at the input couplers 640 is generally described in terms of FOV, for example, using horizontal FOV, vertical FOV, or diagonal FOV as shown in FIG. 8.

FIG. 9 is a pictorial view of an illustrative conventional arrangement of HOEs in an HMD device 900 that are configured for in-coupling, exit pupil expansion in two directions, and out-coupling. FIG. 10 provides a front view of the HMD device 900. The HOEs are typically implemented using DOEs, ROEs, or a combination, however, the HMD device is not limited to the HOE types. The HMD device 900 includes a frame 905 that supports left and right lenses that function as see-through waveguides 910L and 910R. Disposed on each waveguide are an in-coupling HOE 915, intermediate HOE 920, and out-coupling HOE 925. These HOEs provide respective functions for in-coupling, 1D horizontal exit pupil expansion, and out-coupling/1D vertical exit pupil expansion.

Figure 11:
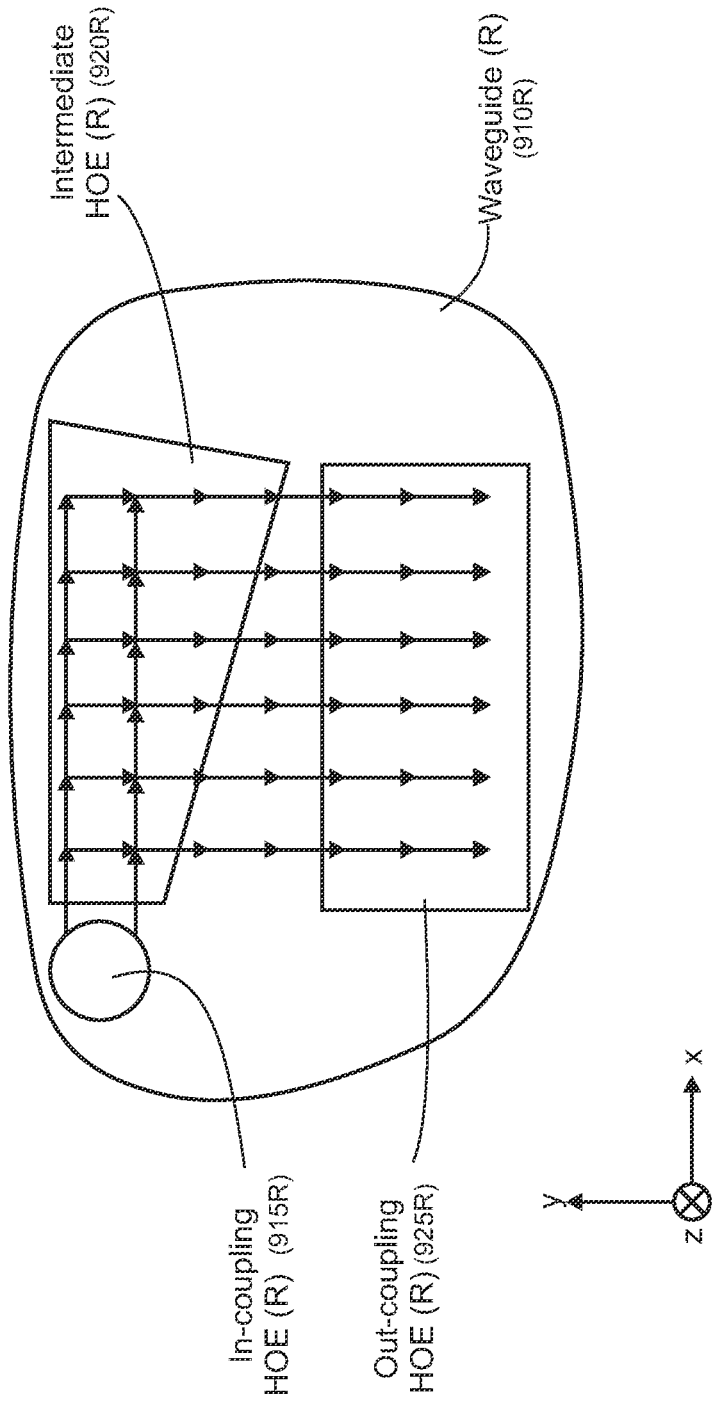
FIG. 11 shows illustrative propagation paths of virtual image light in a conventional arrangement of HOEs in an HMD device.

FIG. 11 shows illustrative propagation paths of virtual image light in the right waveguide 910R of the HMD device 900. The in-coupling HOE 915R receives virtual images from a display engine (not shown) and couples them to the intermediate HOE 920R which horizontally expands the exit pupil and couples the virtual image light downwards (i.e., in the negative y direction) to the out-coupling HOE 925R. The output-coupling HOE vertically expands the exit pupil and out-couples the virtual image light to a user's eye (not shown) with an exit pupil that is expanded in two directions compared to an entrance pupil at the in-coupling HOE.

While the HOE arrangement shown in FIGS. 9-11 performs satisfactorily in some HMD device applications, the arrangement presents some constraints that are not suited for other applications. In particular, the single see-through waveguide supporting all of the HOEs 915, 920 and 925 is located in front of the user's eye within the user's visual field. The design configuration of the out-coupling HOE is therefore restricted in size and position to accommodate the other HOEs on the same waveguide. In addition, the in-coupling and intermediate HOEs at least partially occlude portions of the waveguide 910 and can negatively impact its see-through functionality. While the HOEs are typically implemented using designs, materials, and fabrication techniques that result in a reasonable degree of transparency, the HOEs located within the user's visual field can cause some reduction in see-through quality and brightness.

Figure 12:
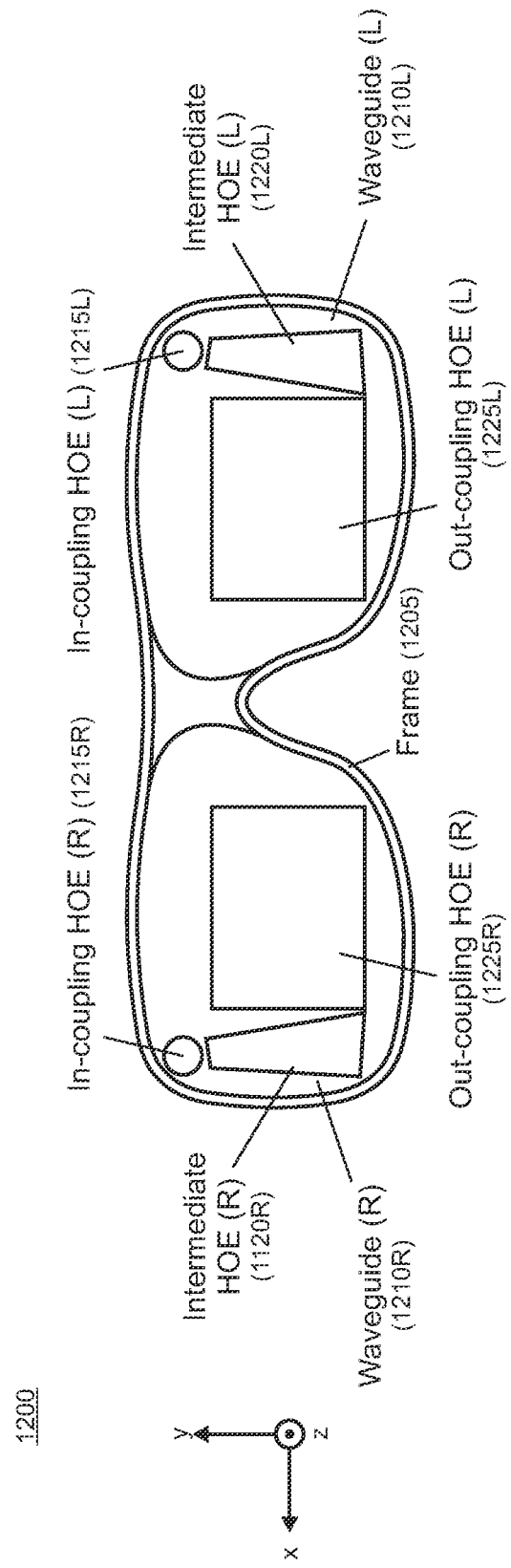
FIG. 12 shows a front view of an illustrative alternative arrangement of HOEs in an HMD device.

FIG. 12 shows a front view of an illustrative alternative arrangement of HOEs in an HMD device 1200. The HMD device includes a frame 1205 that supports left and right lenses that function as waveguides 1210L and 1210R. Disposed on each waveguide are an in-coupling HOE 1215, intermediate HOE 1220, and out-coupling HOE 1225. The HOE arrangement here may have less impact on the optimal out-coupling HOE size and the user's see-through visual field compared to the previous example because the in-coupling and intermediate HOEs are moved outwards from the center of each waveguide 1210. However, design tradeoffs may still be required because all three HOEs are still located on a common waveguide in front of the eye.

Figure 13:
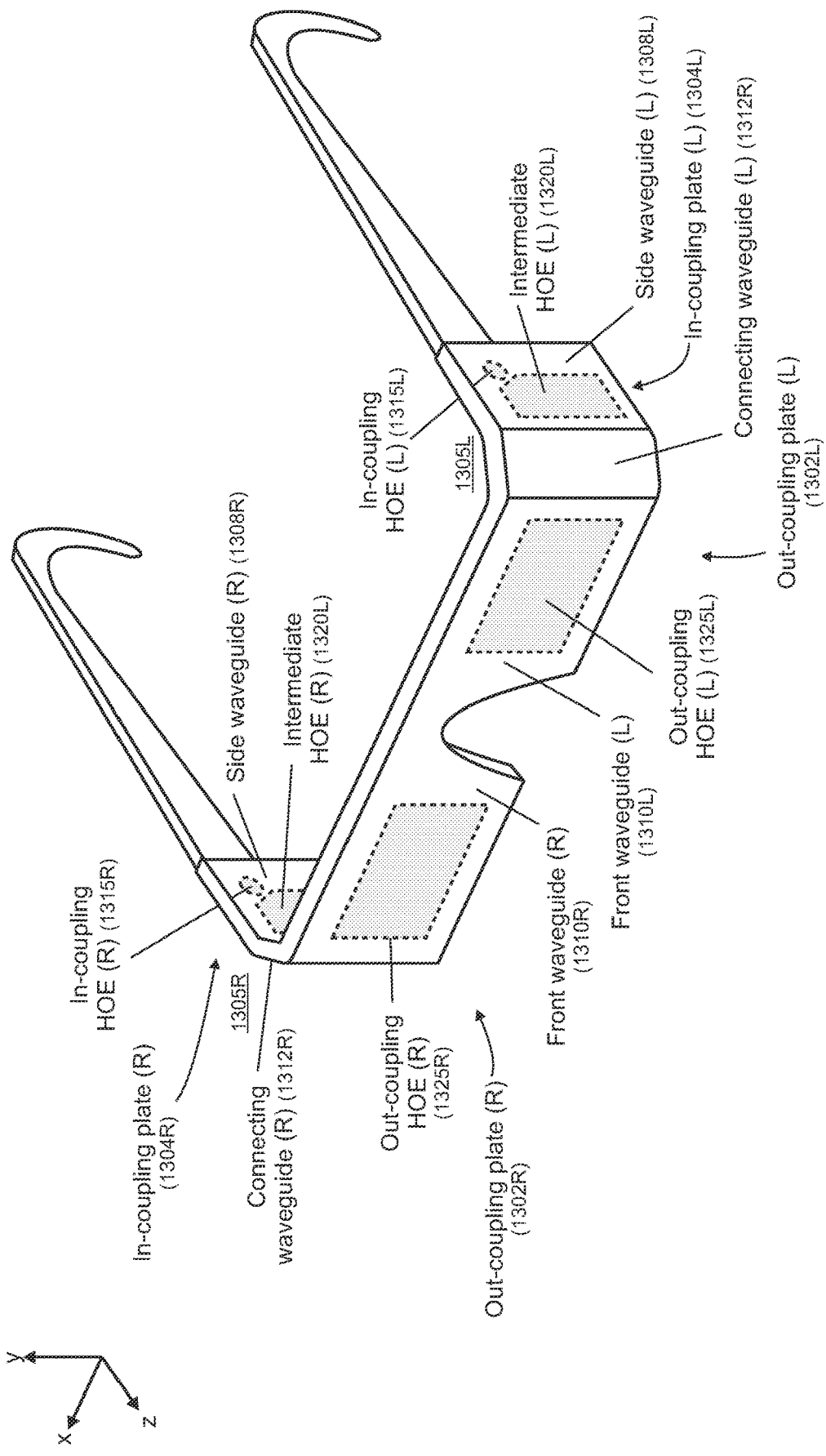
FIG. 13 is a pictorial view of an illustrative example of a mixed-reality HMD device using the present waveguide combiner with separate in-coupling and out-coupling plates.

FIG. 13 is a pictorial view of an illustrative example of a mixed-reality HMD device 1300 using the present waveguide combiner 1305 comprising separate in-coupling and out-coupling plates that are optically coupled via a connecting waveguide. FIG. 14 shows a front view of the HMD device 1300. FIG. 15 shows a top view of a lefthand portion of the HMD device 1300.

As shown, discrete spatially-separated plates are utilized—two for each eye—an out-coupling plate 1302 comprising a front waveguide 1310 and out-coupling HOE 1325, and an in-coupling plate 1304 comprising a side waveguide 1308, an in-coupling HOE 1315, and an intermediate HOE 1320. FIG. 16 is a side view of the left side in-coupling plate 1304L. The geometry of each plate is characterized by opposing broad-area surfaces and opposing proximal and distal edge surfaces.

The edges of the in-coupling plate 1304 and out-coupling plate 1302 are optically coupled by a connecting waveguide 1312. The connecting waveguide has a straight and substantially planar configuration in this particular illustrative example for optically coupling the in-coupling and out-coupling plates through an angled connecting geometry. However, other shapes, configurations, and/or geometries may be utilized for the connective waveguide to meet the needs of a particular implementation of the present waveguide combiner, for example, using straight or curved sections or combinations thereof. The connecting waveguide facilitates a virtual image light propagation path to be established between the two plates so that virtual image light in-coupled by the in-coupling HOE 1315 and propagated by the intermediate HOE 1320 in the in-coupling plate is coupled to out-coupling HOE 1325 in the out-coupling plate for out-coupling to an eye of the user.

As shown in the drawings, the connecting waveguide 1312 enables the respective broad-area surfaces of the in-coupling plate 1304 and out-coupling plate 1302 to be non-parallel. Such non-parallel configuration supports utilization of an eyeglasses form factor, for example, in which the out-coupling plate is located in a front lens of the HMD device while the in-coupling plate is located in a temple of the device. The plate separation advantageously enables the out-coupling HOE 1325 to be optimally positioned and sized in the front lens of the HMD device, for example, to provide large eyebox for virtual image display, while minimizing the negative impacts on see-through quality.

In an illustrative example of the present waveguide combiner using separate in-coupling and out-coupling plates, an ROE architecture is utilized to support full color virtual images, for example, using a red, green, blue (RGB) color model that is supported by a suitable display engine. Compared to DOE architectures which commonly utilize a stack of waveguides with a separate waveguide for each color component of the model, an ROE architecture can typically utilize a single-layered waveguide approach to propagate the full color virtual images.

FIG. 17 shows illustrative fabrication techniques for an ROE using stacked glass blanks that have one or more layers of thin film deposited on one or more surfaces. A glass sheet is cut to form uniformly sized and shaped blanks. The sheet is provided with reflectors, such as thin film coatings, prior to cutting, or the blanks may be individually provided with reflectors or coatings after cutting. The blanks, representatively indicated by reference numeral 1705, are assembled into a stack 1710 using a bonding agent on the major planar surfaces and/or around the peripheral edges. It will be appreciated that the number of blanks in the stack determines the number of cascaded mirror elements in an array. Cutting, grinding, and/or polishing steps can optionally be utilized during the fabrication and assembly of the blanks, stack, or ROE.

The stack 1710 is cut along parallel planes at an oblique angle with respect to the stack axis that is suitable to implement a desired amount of tilt in the mirror elements in the finished ROE (e.g., the top ROE 925). In this illustrative example, as shown in the enlarged view 1715, the top planar surface of each blank is coated with a thin-film coating 1700 comprising single or multiple layers of dielectric materials in which the coating composition and thickness is selected to provide the desired reflectance characteristics over the FOV of interest. For example, the dielectric materials may each be different, as indicated in the enlarged view by reference numerals 1720, 1725, and 1730, or alternating layers of two or more different materials are usable in some cases. Generally, each dielectric material has a different index of refraction or other characteristics and may include silicon dioxide ($SiO_2$), titanium dioxide ($TiO_2$), and aluminum oxide ($Al_2O_3$). In an illustrative embodiment, the layers of different materials are alternately arranged using, for example, silicon dioxide and titanium dioxide.

Other exemplary dielectric materials that can be included in the coating 1700 may include, but are not limited to, silicon hydride ($Si_xH_y$), silicon nitride ($Si_xN_y$), silicon oxynitride ($Si_xO_zN_y$), tantalum oxide ($Ta_xO_y$), gallium arsenide (GaAs), and gallium nitride (GaN). It is also possible that one or more layers of the coating may comprise metallic layers that are non-dielectric.

Chemical and/or physical deposition techniques can be used to deposit the materials on a surface of a blank 1705 to form the coating 1700. Exemplary chemical deposition techniques that can be used include, but are not limited to, chemical solution deposition (CSD), spin coating, chemical vapor deposition (CVD), plasma-enhanced chemical film conversion (PECFC), and atomic layer deposition (ALD). Exemplary physical deposition techniques that can be used include, but are not limited to, physical vapor deposition (PVD), molecular beam epitaxy (MBE), sputtering, pulsed laser deposition (PLD), cathodic arc deposition (arc-PVD), and electrohydrodynamic deposition.

It is noted that the number of layers shown in FIG. 17 is intended to be illustrative and that variations from the configuration shown can be expected, as necessary to meet the requirements of a particular implementation. In general, it is desirable to minimize the number of layers to simplify fabrication and reduce costs. Thicker coatings may give rise to stresses in the ROEs that can cause strain in the waveguide combiner that may negatively impact alignment and flatness (with concomitant negative impact on display quality) and reduce reliability. While thicker substrates may be used to reduce the strain and help to maintain alignment and flatness, such configuration may result in more weight being added to the waveguide combiner assembly which is typically undesirable in HMD device applications.

An alternative to thin-film coatings for mirror elements in an ROE includes molded plastic optical elements such as microprism arrays which may be suitable in some applications. A microprism array is injection-molded in an illustrative embodiment and may utilize a plastic waveguide in some cases which can advantageously reduce weight and cost. Coatings are applied to microprism arrays in some applications to further enable tuning of reflectance and transmittance parameters.

ROEs produced using the fabrication techniques discussed above may be utilized in various alternative forms in the present waveguide combiner as discussed below in the text accompanying FIGS. 18-23 for both planar and curved waveguides.

FIG. 18 is a top view of a first illustrative embodiment of an ROE 1800 using a concatenated array 1805 of mirror elements that are embedded in a planar waveguide 1810. The in-coupling HOE 1315 is embodied as a prism in this embodiment which in-couples virtual image light from the display engine 405 and imaging optics 415 to the waveguide. The construction and arrangement of mirror elements shown in FIG. 18 are generally applicable to the intermediate HOE and out-coupling HOE in typical applications.

The individual mirror elements (representatively indicated by reference numeral 1815) are implemented in this illustrative embodiment using thin film coatings to provide partial reflectivity (i.e., beam splitting functionality), as described in further detail below. The mirror elements are alternatively implementable as half-tone, dielectric, embedded micro-prism arrays, or volume holograms, using flat or curved construction. In some implementations the mirror elements are lensed using various lens powers, typically depending on a distance from the display engine. In some implementations, the mirror elements in the array are variable with respect to type and reflectance/transmittance. As shown, the mirror elements are tilted with respect to the x-y plane of the waveguide.

FIG. 19 is a top view of a second illustrative embodiment of an ROE 1900 using a concatenated array 1905 of mirror elements that are partially embedded in a planar waveguide 1910. The mirror elements (representatively indicated by reference numeral 1915) are implementable using similar configuration options as with the fully embedded mirror elements in array 1805 (FIG. 18). The partial embedding provides some waveguide combiner design flexibility in some applications, for example, with respect to enhancements to see-through functionality, depth of focus, and/or FOV.

FIG. 20 is a top view of a third illustrative embodiment of an ROE 2000 using a concatenated array 2005 of fractured mirror elements that are embedded in a planar waveguide 2010. The fractured mirror elements (representatively indicated by reference numeral 2015) can function as a Fresnel element and/or gain see-through or depth of focus for the waveguide combiner. Otherwise, the mirror elements are implementable using similar configuration options as with the fully or partially embedded mirror elements described above.

FIG. 21 is a top view of a fourth illustrative embodiment of an ROE 2100 using a concatenated array 2105 of mirror elements that are embedded in a curved waveguide 2110. The in-coupling HOE 1315 is embodied as a prism in this embodiment which in-couples virtual image light from the display engine 405 and imaging optics 415 to the waveguide.

FIG. 22 is a top view of a fifth illustrative embodiment of an ROE 2200 using a concatenated array 2205 of mirror elements that are partially embedded in a curved waveguide 2210. The mirror elements (representatively indicated by reference numeral 2215) are implementable using similar configuration options as with the fully embedded mirror elements in array 2105 (FIG. 21). The partial embedding provides some waveguide combiner design flexibility in some applications, for example, with respect to enhancements to see-through functionality, depth of focus, and/or FOV.

FIG. 23 is a top view of a sixth illustrative embodiment of an ROE 2300 using a concatenated array 2305 of fractured mirror elements that are embedded in a curved waveguide 2310. The fractured mirror elements (representatively indicated by reference numeral 2315) can function as a Fresnel element and/or gain see-through or depth of focus for the waveguide combiner. Otherwise, the mirror elements are implementable using similar configuration options as with the fully or partially embedded mirror elements described above.

A discussion of an illustrative method for waveguide combiner fabrication using an insert molding process is provided below. In this example, out-coupling and intermediate HOEs are implemented using ROEs fabricated in accordance with the method shown in FIG. 17 and discussed in the accompanying text.

Figure 24:
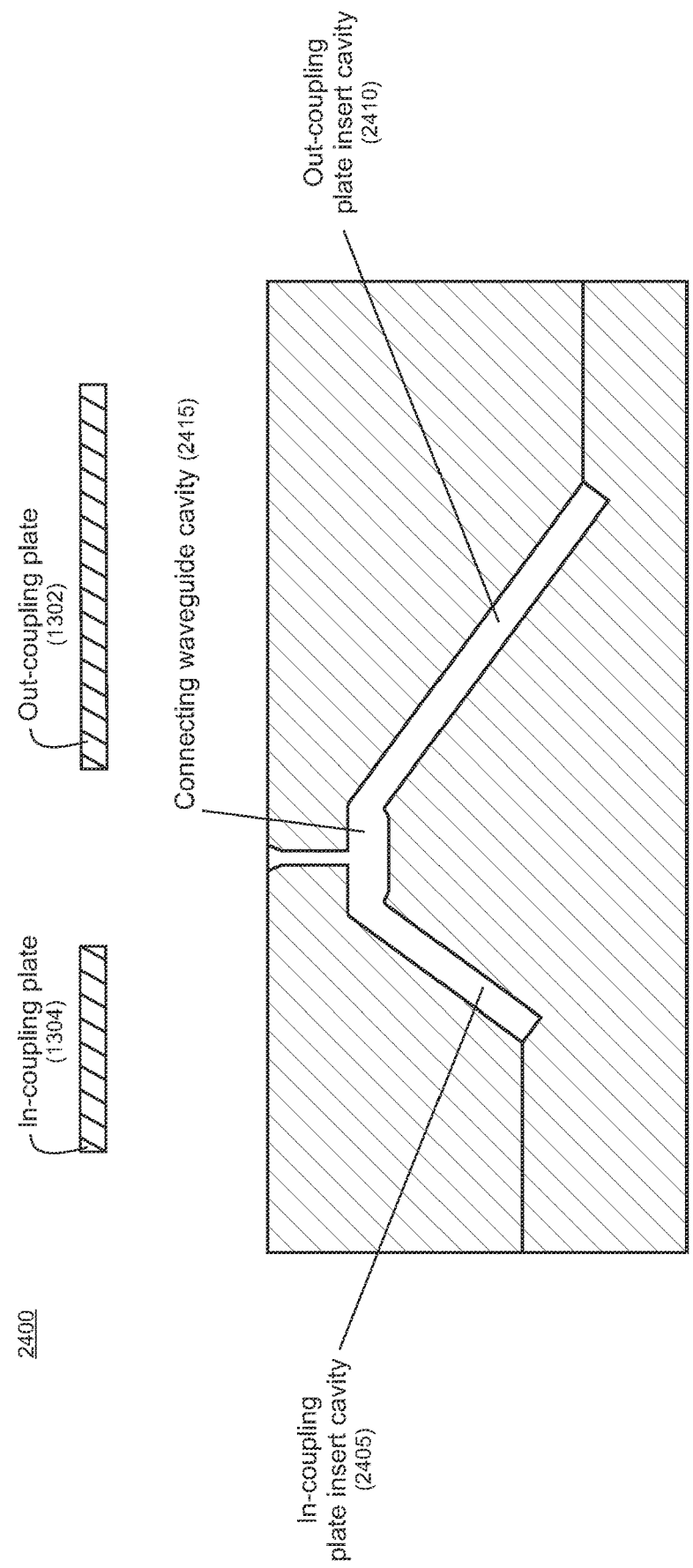
FIG. 24 is a cross-sectional view of an illustrative injection mold usable for fabricating the present waveguide combiner with separate in-coupling and out-coupling plates.

FIG. 24 is a cross-sectional view of an illustrative multi-piece injection mold 2400 that includes an in-coupling plate insert cavity 2405 and an out-coupling plate insert cavity 2410. The in-coupling plate insert cavity is configured to accept an in-coupling plate 1304 comprising an in-coupling ROE and an intermediate ROE as an insert. The out-coupling plate insert cavity is configured to accept an out-coupling plate 1302 comprising an out-coupling ROE as an insert. The injection mold also provides a connecting waveguide cavity 2415.

Figure 25:
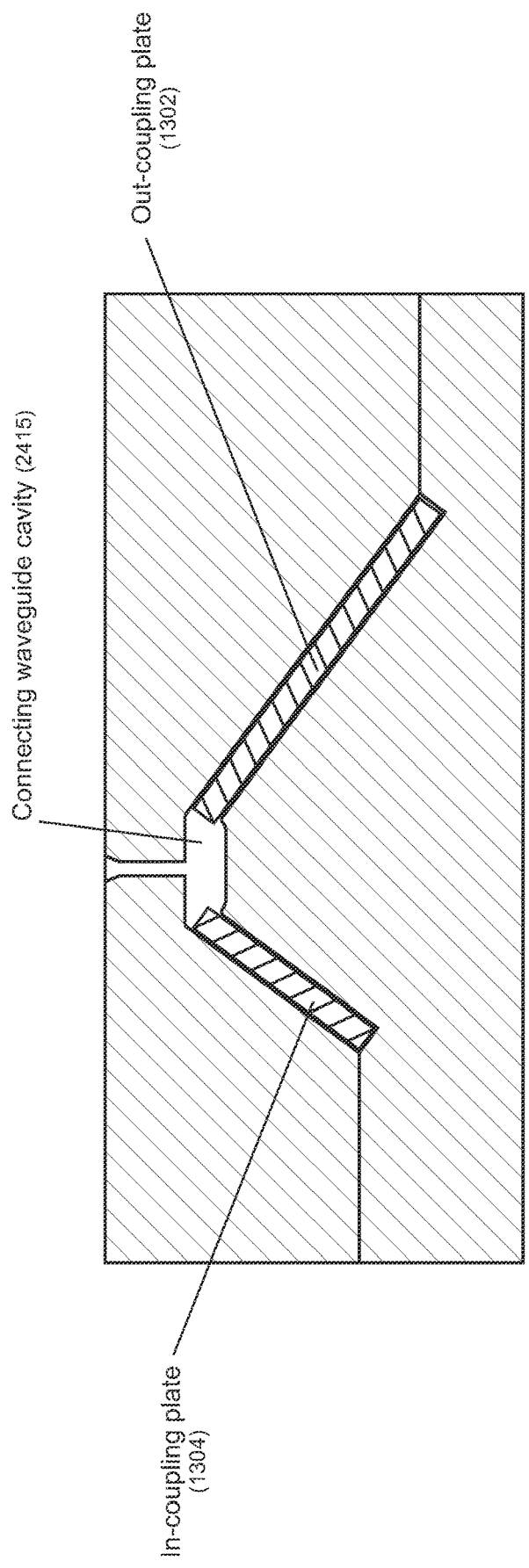
FIG. 25 is a cross-sectional view of an illustrative injection mold into which in-coupling and out-coupling plates are placed as inserts.
Figure 26:
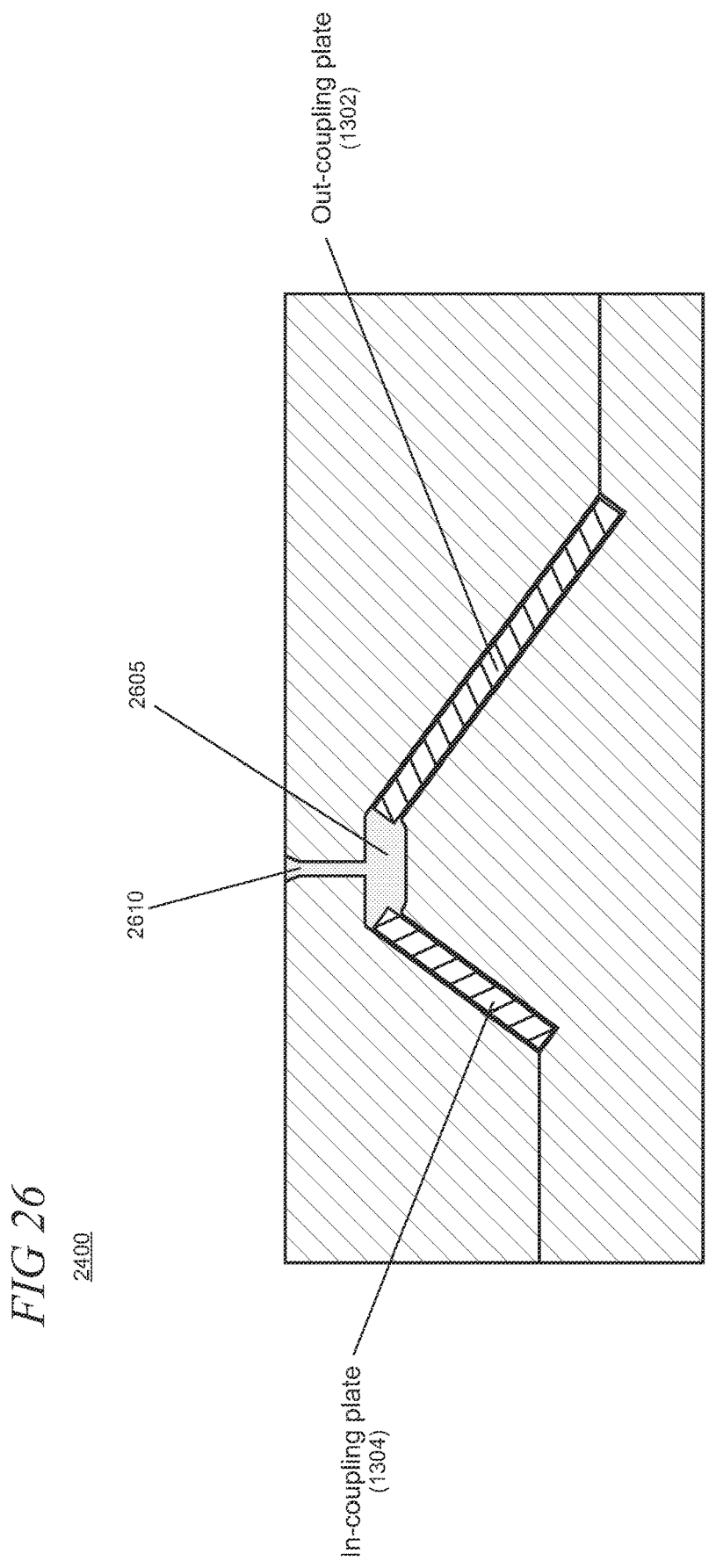
FIG. 26 is a cross-sectional view of an illustrative injection mold as utilized in an insert molding process.
Figure 27:
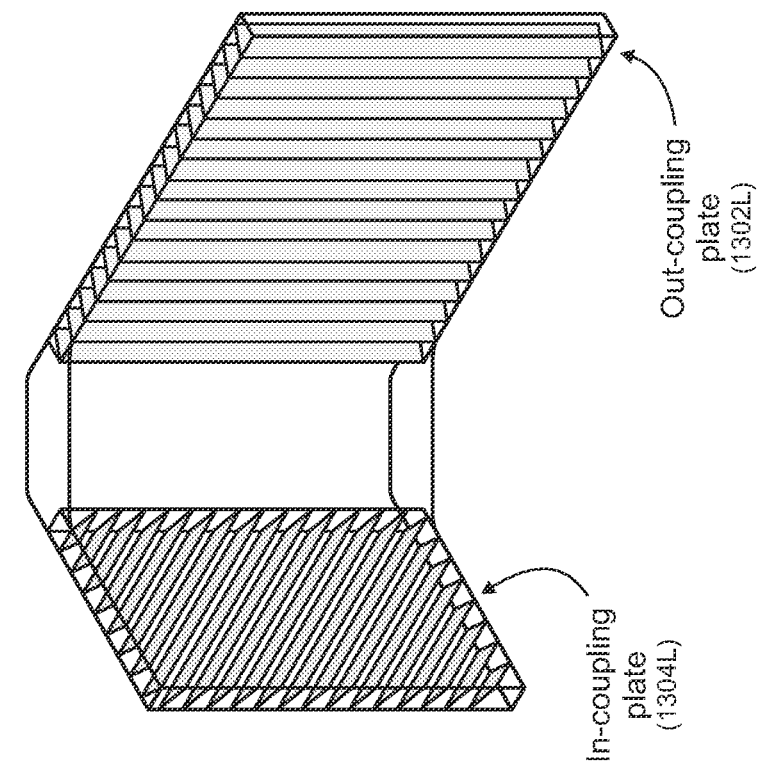
FIG. 27 is a pictorial view of an illustrative waveguide combiner as removed from an injection mold.

FIG. 25 is a cross-sectional view of the injection mold 2400 into which an in-coupling plate 1304 and out-coupling plate 1302 are placed into respective cavities as inserts. An insert injection molding process is utilized by which optically transparent polymer 2605 is injected into the mold through gate 2610, as shown in FIG. 26. FIG. 27 is a pictorial view of a representative portion of the waveguide combiner 1305L as removed from the injection mold 2400 (FIG. 24).

Figure 28:
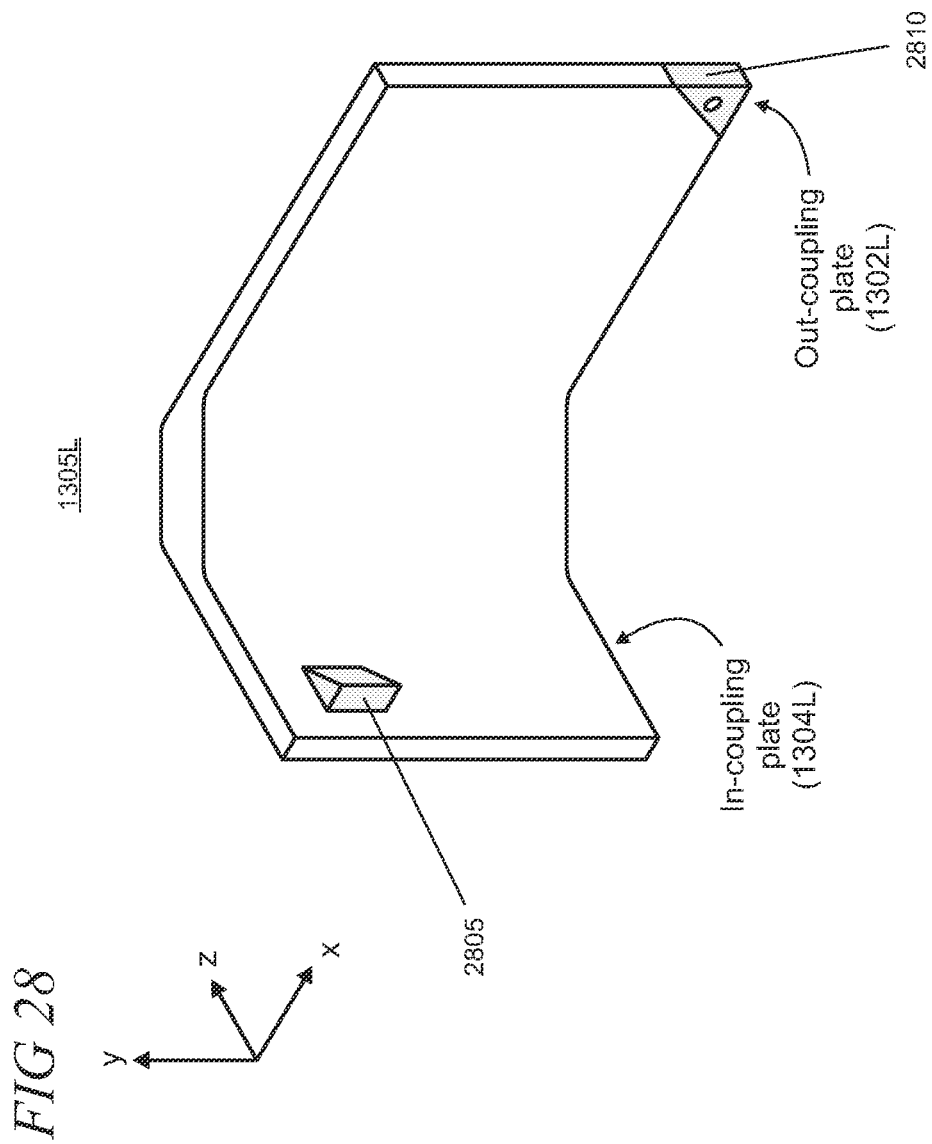
FIG. 28 is a pictorial view of an illustrative waveguide combiner that includes additional molded features.

The injection mold shown in FIG. 24 and described in the accompanying text may be adapted to provide additional optional features in some implementations. FIG. 28 is a pictorial view of an illustrative waveguide combiner 1305L that is modified to include additional molded features (the ROEs in the plates are not shown for sake of clarity). In this example, an input prism 2805 is molded into the in-coupling plate 1304L and a positioning feature 2810 is molded into the out-coupling plate 1302L.

Figure 29:
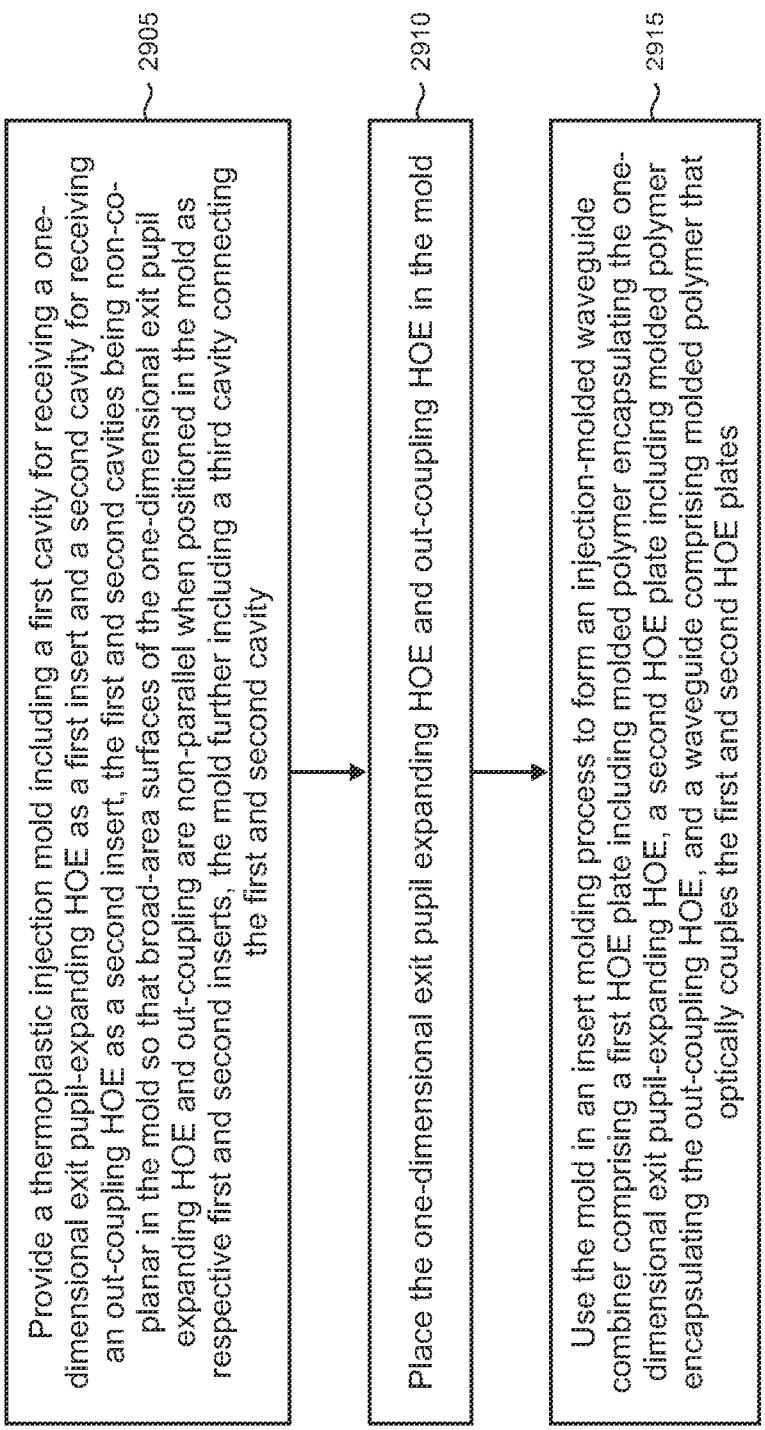
FIG. 29 is a flowchart of an illustrative method for fabricating a waveguide combiner with separate in-coupling and out-coupling plates.

FIG. 29 is a flowchart of an illustrative method 2900 for fabricating a waveguide combiner with separate plates of HOEs, in which the waveguide combiner is utilizable in a mixed-reality environment wherein virtual images are mixed with real-world images. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 2905 includes providing a thermoplastic injection mold including a first cavity for receiving a one-dimensional exit pupil-expanding HOE as a first insert and a second cavity for receiving an out-coupling HOE as a second insert, the first and second cavities being non-co-planar in the mold so that broad-area surfaces of the one-dimensional exit pupil-expanding HOE and out-coupling are non-parallel when positioned in the mold as respective first and second inserts, the mold further including a third cavity connecting the first and second cavity.

Block 2910 includes placing the one-dimensional exit pupil-expanding HOE and out-coupling HOE in the mold. Block 2915 includes using the mold in an insert molding process to form an injection-molded waveguide combiner comprising a first HOE plate including molded polymer encapsulating the one-dimensional exit pupil-expanding HOE, a second HOE plate including molded polymer encapsulating the out-coupling HOE, and a waveguide comprising molded polymer that optically couples the first and second HOE plates.

Figure 30:
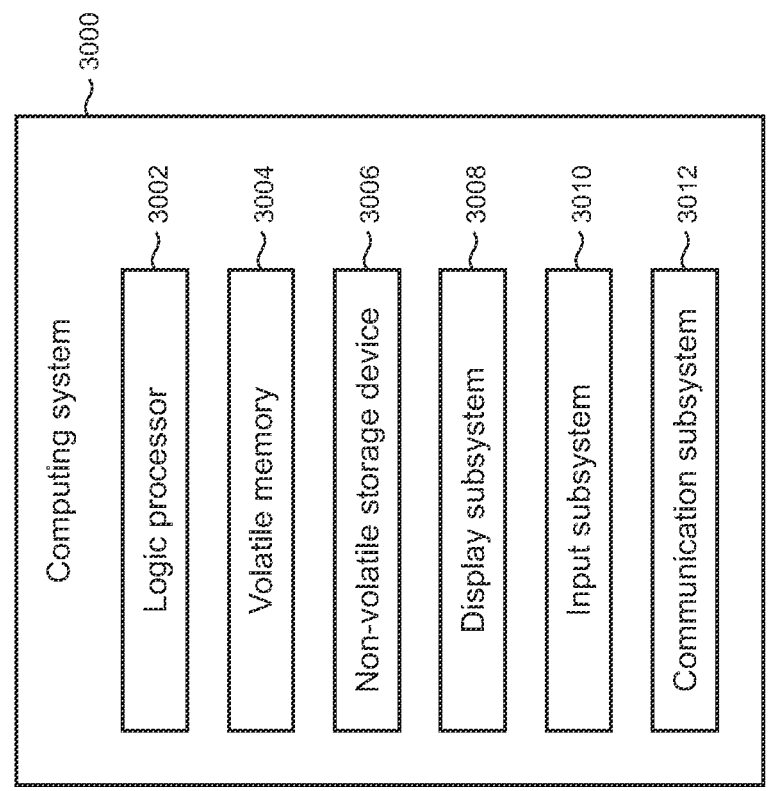
FIG. 30 shows a block diagram of an illustrative electronic device that incorporates a mixed-reality display system using the present waveguide combiner with separate in-coupling and out-coupling plates.

FIG. 30 schematically shows an illustrative example of a computing system 3000 that can enact one or more of the systems, features, functions, methods and/or processes described above for the present waveguide combiner with separate in-coupling and out-coupling plates. The computing system is shown in simplified form. The computing system may take the form of one or more personal computers, server computers, tablet computers, home-entertainment computers, network computing devices, gaming devices, mobile computing devices, mobile communication devices (e.g., smartphone), wearable computers, and/or other computing devices.

The computing system 3000 includes a logic processor 3002, a volatile memory 3004, and a non-volatile storage device 3006. The computing system may optionally include a display subsystem 3008, input subsystem 3010, communication subsystem 3012, and/or other components not shown in FIG. 30.

The logic processor 3002 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 3002 includes one or more processors configured to execute software instructions. In addition, or alternatively, the logic processor includes one or more hardware or firmware logic processors configured to execute hardware or firmware instructions. Processors of the logic processor may be single-core or multi-core, and the instructions executed thereon are configurable for sequential, parallel, and/or distributed processing. Individual components of the logic processor are optionally distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines.

The non-volatile storage device 3006 includes one or more physical devices configured to hold instructions executable by the logic processors to implement the methods and processes described herein. When such methods and processes are implemented, the state of the non-volatile storage device may be transformed—e.g., to hold different data.

The non-volatile storage device 3006 may include physical devices that are removable and/or built-in. Non-volatile storage device may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. The non-volatile storage device may include non-volatile, dynamic, static, read/write, read-only, sequential-access, location-addressable, file-addressable, and/or content-addressable devices. It will be appreciated that the non-volatile storage device is configured to hold instructions even when power is cut to the non-volatile storage device.

The volatile memory 3004 may include physical devices that include random access memory. The volatile memory is typically utilized by the logic processor 3002 to temporarily store information during processing of software instructions. It will be appreciated that the volatile memory typically does not continue to store instructions when power is cut to the volatile memory.

Aspects of logic processor 3002, volatile memory 3004, and non-volatile storage device 3006 are capable of integration into one or more hardware-logic components. Such hardware-logic components include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" is typically used to describe an aspect of computing system 3000 implemented in software by a processor to perform a particular function using portions of volatile memory, which function involves transformative processing that specially configures the processor to perform the function. Thus, a program may be instantiated via the logic processor 3002 executing instructions held by the non-volatile storage device 3006, using portions of the volatile memory 3004. It will be understood that different programs may be instantiated from the same application, service, code block, object, library, routine, API (application programming interface), function, etc. Likewise, the same program may be instantiated by different applications, services, code blocks, objects, routines, APIs, functions, etc. A program may encompass individual or groups of executable files, data files, libraries, drivers, scripts, database records, etc.

When included, the display subsystem 3008 may be used to present a visual representation of data held by the non-volatile storage device 3006. This visual representation may take the form of a graphical user interface (GUI). As the herein described methods and processes change the data held by the non-volatile storage device, and thus transform the state of the non-volatile storage device, the state of the display subsystem 3008 is likewise transformed to visually represent changes in the underlying data. The display subsystem may include one or more display devices utilizing virtually any type of technology; however, one utilizing a MEMS projector to direct laser light may be compatible with the eye-tracking subsystem in a compact manner. Such display devices may be combined with the logic processor 3002, volatile memory 3004, and/or non-volatile storage device 3006 in a shared enclosure, or such display devices may be peripheral display devices.

When included, the input subsystem 3010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry includes a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication subsystem 3012 may be configured to communicatively couple various computing devices described herein with each other, and with other devices. Communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 3000 to send and/or receive messages to and/or from other devices via a network such as the Internet.

Various exemplary embodiments of the present waveguide combiner with separate in-coupling and out-coupling plates are now presented by way of illustration and not as an exhaustive list of all embodiments. An example includes a waveguide combiner employable by a user in a mixed-reality environment that includes views of a real world combined with images of virtual objects from a virtual world, comprising: a first plate comprising a first volume of polymeric optically transparent material having opposing broad-area surfaces and opposing proximal and distal edge surfaces, the first plate including an internally-embedded in-coupling holographic optical element (HOE) configured for in-coupling light for virtual images into the waveguide combiner from a display engine; a second plate comprising a second volume of polymeric optically transparent material through which the user sees the real world, the second plate having opposing broad-area surfaces and opposing proximal and distal edge surfaces, the second plate including an internally embedded out-coupling HOE configured for out-coupling the virtual image light from the waveguide combiner to an eye of the user; and a waveguide comprising a third volume of polymeric optically transparent material, the waveguide configured for coupling the distal edge surface of the first plate to the proximal edge surface of the second plate, the waveguide propagating virtual image light from the first plate to the second plate, wherein the first plate and the second plate are spatially separated in the waveguide combiner and respective broad-area surfaces of the first and second plates are non-parallel in the waveguide combiner.

In another example, the waveguide combiner further comprises an intermediate HOE embedded in the first plate, the intermediate HOE configured for pupil expansion in a first direction, and wherein the out-coupling HOE is configured for pupil expansion in a second direction, the first direction being orthogonal to the second direction. In another example, one or more of the HOEs comprise a plurality of mutually-parallel reflecting internal surfaces arranged in a cascade to progressively reflect light propagating within a plate. In another example, the in-coupling HOE comprises one of a prism or prism array. In another example, the first plate and second plate are configured to propagate light in total internal reflection. In another example, one or more of the HOEs comprise a stack of glass plates, one or more of the plates including a partial mirror so that the stack functions as a beam splitter. In another example, the first plate, second plate, and waveguide comprise molded polymer.

A further example includes a head-mounted display (HMD) device wearable by a user and supporting a mixed-reality experience comprising a display of virtual images for objects in a virtual world and real-world images for objects in a real world, comprising: a display engine generating an entrance pupil comprising one or more optical beams for the virtual images; a see-through waveguide combiner configured to receive the virtual images from the display engine with the entrance pupil, the waveguide combiner configured to provide an exit pupil for the virtual images that is expanded in two directions relative to the entrance pupil generated by the display engine, the waveguide combiner including a see-through portion, located on the HMD device in front of an eye of the user when the HMD device is donned, through which the user views the real world; a see-through plate disposed in the see-through portion of the waveguide combiner, the see-through plate including an out-coupling holographic optical element (HOE) configured for out-coupling virtual images to the eye of the user, the out-coupling HOE further configured for expanding the exit pupil in a first direction of the two directions; a non-see-through plate, disposed in the HMD device externally to the see-through portion of the waveguide combiner, the non-see-through plate including an in-coupling HOE configured for in-coupling the virtual images into the waveguide combiner, the non-see-through plate further including an intermediate HOE configured for expanding the exit pupil in a second direction of the two directions, wherein the first direction is orthogonal to the second direction; and a connecting waveguide optically coupling the see-thorough plate and non-see-through plate, wherein the see-through plate and non-see-through plate are non-co-planar in the waveguide combiner.

In another example, the HMD device has an eyeglasses form factor with a pair of lenses coupled by a bridge and a pair of temples, wherein the see-through plate is disposed in a lens and the non-see-through plate is disposed in a temple of the pair of temples. In another example, sections of the connecting waveguide have a shape selected from one of straight, curved, or a combination of straight and curved. In another example, one or more of the HOEs comprise a reflective optical element, a diffractive optical element, or volume holographic grating. In another example, the see-through plate and the non-see-through plate are spatially separated in the waveguide combiner. In another example, one or more of the in-coupling HOE, intermediate HOE, and out-coupling HOE are fabricated from stacked layers of glass and one or more of the see-through plate, non-see-through plate, and waveguide are fabricated from injection-molded polymer. In another example, the see-through plate and non-see-through plate each comprise a stack of sub-plates, wherein each sub-plate propagates a unique color in an RGB (red, green, blue) color model. In another example, the see-through plate and non-see-through plate are each configured as a single layer plate for propagating polychromatic virtual image light. In another example, the in-coupling HOE comprises a prism. In another example, the out-coupling HOE is sized to fill the see-through portion of the waveguide combiner substantially in its entirety.

A further example includes a method for fabricating a waveguide combiner with separate plates of holographic optical elements (HOEs), the waveguide combiner utilizable in a mixed-reality environment in which virtual images are mixed with real-world images, comprising: providing a thermoplastic injection mold including a first cavity for receiving a one-dimensional exit pupil-expanding HOE as a first insert and a second cavity for receiving an out-coupling HOE as a second insert, the first and second cavities being non-co-planar in the mold so that broad-area surfaces of the one-dimensional exit pupil-expanding HOE and out-coupling HOE are non-parallel when positioned in the mold as respective first and second inserts, the mold further including a third cavity connecting the first and second cavity; placing the one-dimensional exit pupil-expanding HOE and out-coupling HOE in the mold; and using the mold in an insert molding process to form an injection-molded waveguide combiner comprising a first HOE plate including molded polymer encapsulating the one-dimensional exit pupil-expanding HOE, a second HOE plate including molded polymer encapsulating the out-coupling HOE, and a waveguide comprising molded polymer that optically couples the first and second HOE plates.

In another example, the method further includes providing a cavity in the mold to form an input-coupling prism in the first HOE plate in the injection-molded waveguide combiner. In another example, the method further includes providing a cavity in the mold to form a positioning feature in one of the waveguide, first HOE plate, or second HOE plate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A head-mounted display (HMD) device wearable by a user and supporting a mixed-reality experience comprising a display of virtual images for objects in a virtual world and real-world images for objects in a real world, comprising:
   a display engine generating an entrance pupil comprising one or more optical beams for the virtual images;
   a see-through waveguide combiner configured to receive the virtual images from the display engine with the entrance pupil, the waveguide combiner configured to provide an exit pupil for the virtual images that is expanded in two directions relative to the entrance pupil generated by the display engine;
   a see-through plate, disposed in the waveguide combiner, located in front of an eye of the user when the HMD is donned, through which the user views the real world, the see-through plate including an out-coupling holographic optical element (HOE), disposed in a front waveguide, configured for out-coupling virtual images to the eye of the user, the out-coupling HOE further configured for expanding the exit pupil in a first direction of the two directions;
   a non-see-through plate, disposed in a temple of the HMD device outside a boundary of a visual field of the user when the HMD device is donned, the non-see-through plate including an in-coupling HOE, disposed in a side waveguide, configured for in-coupling the virtual images into the non-see-through plate, the non-see-through plate further including an intermediate HOE, disposed in a side waveguide, configured for expanding the exit pupil in a second direction of the two directions, wherein the first direction is orthogonal to the second direction; and
   a connecting waveguide optically coupling the see through plate and non-see-through plate wherein the connecting waveguide is optically coupled along edges of respective waveguides in the see-through and the non-see-through plates to enable the virtual images in-coupled into the non-see-through plate to propagate in total internal reflection to the see-through plate in the waveguide combiner and be out-coupled by the out-coupling HOE to the eye of the user, wherein the see-through plate and non-see-through plate are non-co-planar in the waveguide combiner.

2. The HMD device of claim 1 having an eyeglasses form factor having a pair of lenses coupled by a bridge and a pair of temples, wherein the see-through plate is disposed in a lens and the non-see-through plate is disposed in a temple of the pair of temples.

3. The HMD device of claim 1 in which sections of the connecting waveguide have a shape selected from one of straight, curved, or a combination of straight and curved.

4. The HMD device of claim 1 in which one or more of the HOEs comprise a reflective optical element, a diffractive optical element, or volume holographic grating.

5. The HMD device of claim 1 in which the see-through plate and the non-see-through plate are spatially separated in the waveguide combiner.

6. The HMD device of claim 1 in which one or more of the in-coupling HOE, intermediate HOE, and out-coupling HOE are fabricated from stacked layers of glass and one or more of the see-through plate, non-see-through plate, and waveguide are fabricated from injection-molded polymer.

7. The HMD device of claim 1 in which the see-through plate and non-see-through plate each comprise a stack of sub-plates, wherein each sub-plate propagates a unique color in an RGB (red, green, blue) color model.

8. The HMD device of claim 1 in which the see-through plate and non-see-through plate are each configured as a single layer plate for propagating polychromatic virtual image light.

9. The HMD device of claim 1 in which the in-coupling HOE comprises a prism.

10. The HMD device of claim 1 in which the out-coupling HOE is sized to fill the see-through portion of the waveguide combiner substantially in its entirety.

\* \* \* \* \*